United States Patent
Holz et al.

(10) Patent No.: US 9,105,103 B2
(45) Date of Patent: Aug. 11, 2015

(54) SYSTEMS AND METHODS OF TRACKING OBJECT MOVEMENTS IN THREE-DIMENSIONAL SPACE

(71) Applicant: Leap Motion, Inc., San Francisco, CA (US)

(72) Inventors: David Holz, San Francisco, CA (US); W. Dale Hall, Oakland, CA (US)

(73) Assignee: Leap Motion, Inc., San Francisco, CA (US)

(*) Notice: Subject to any disclaimer, the term of this patent is extended or adjusted under 35 U.S.C. 154(b) by 0 days.

(21) Appl. No.: 14/162,720

(22) Filed: Jan. 23, 2014

(65) Prior Publication Data

US 2014/0205146 A1    Jul. 24, 2014

Related U.S. Application Data

(60) Provisional application No. 61/755,660, filed on Jan. 23, 2013.

(51) Int. Cl.
*G06T 7/20*    (2006.01)

(52) U.S. Cl.
CPC ..... *G06T 7/2046* (2013.01); *G06T 2207/10016* (2013.01); *G06T 2207/10028* (2013.01); *G06T 2207/30196* (2013.01)

(58) Field of Classification Search
CPC .................................................. G06T 7/2204
USPC ........................................................ 382/103
See application file for complete search history.

(56) References Cited

U.S. PATENT DOCUMENTS

| | | | | |
|---|---|---|---|---|
| 4,928,175 A * | 5/1990 | Haggren | | 348/159 |
| 5,581,276 A * | 12/1996 | Cipolla et al. | | 345/156 |
| 5,757,674 A * | 5/1998 | Marugame | | 702/152 |
| 6,072,903 A | 6/2000 | Maki et al. | | |
| 6,269,172 B1 * | 7/2001 | Rehg et al. | | 382/103 |
| 7,003,134 B1 * | 2/2006 | Covell et al. | | 382/103 |
| 7,129,927 B2 * | 10/2006 | Mattsson | | 345/158 |
| 7,826,641 B2 * | 11/2010 | Mandella et al. | | 382/106 |
| 8,166,421 B2 * | 4/2012 | Magal et al. | | 715/863 |
| 8,638,989 B2 * | 1/2014 | Holz | | 382/103 |
| 8,644,552 B2 * | 2/2014 | Han et al. | | 382/103 |
| 8,666,115 B2 | 3/2014 | Perski et al. | | |
| 8,866,888 B2 * | 10/2014 | Chen et al. | | 348/46 |
| 2007/0091174 A1 * | 4/2007 | Kochi et al. | | 348/135 |
| 2009/0103780 A1 | 4/2009 | Nishihara et al. | | |
| 2010/0027845 A1 | 2/2010 | Kim et al. | | |
| 2011/0234840 A1 * | 9/2011 | Klefenz et al. | | 348/222.1 |
| 2013/0259304 A1 * | 10/2013 | Aller | | 382/103 |
| 2014/0204204 A1 * | 7/2014 | Sumiyoshi et al. | | 348/140 |
| 2014/0211989 A1 * | 7/2014 | Ding et al. | | 382/103 |

OTHER PUBLICATIONS

International Search Report (US RO; KR SA), counterpart application, WO 2014/116882A1, published Jul. 31, 2014, pp. 60-61.

* cited by examiner

*Primary Examiner* — Kim Vu
*Assistant Examiner* — Molly Delaney
(74) *Attorney, Agent, or Firm* — Haynes Beffel & Wolfeld LLP

(57) ABSTRACT

The technology disclosed relates to tracking movement of a real world object in three-dimensional (3D) space. In particular, it relates to mapping, to image planes of a camera, projections of observation points on a curved volumetric model of the real world object. The projections are used to calculate a retraction of the observation points at different times during which the real world object has moved. The retraction is then used to determine translational and rotational movement of the real world object between the different times.

17 Claims, 21 Drawing Sheets

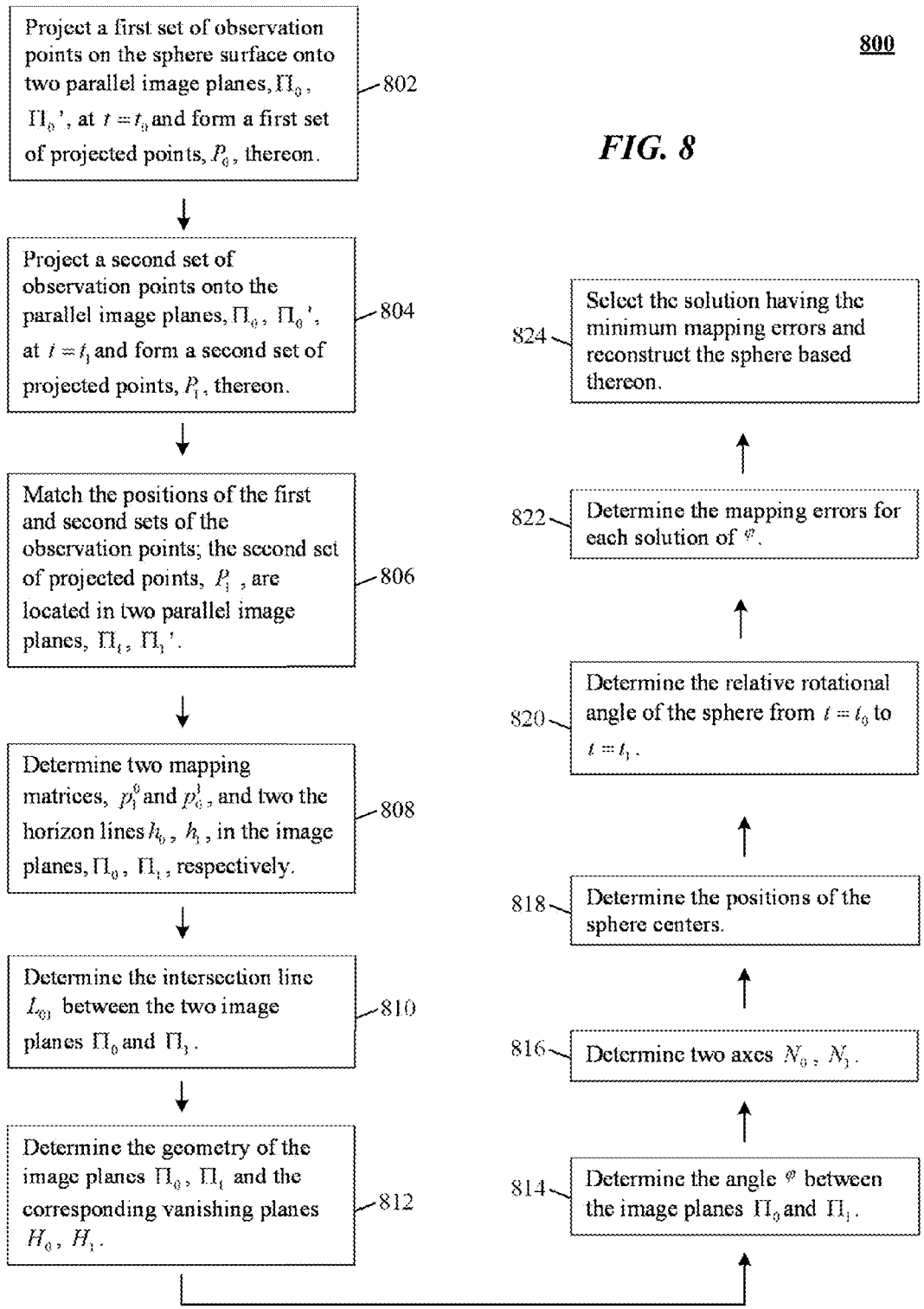

SYSTEMS AND METHODS OF TRACKING OBJECT MOVEMENTS IN THREE-DIMENSIONAL SPACE

RELATED APPLICATION

This application claims the benefit of U.S. provisional Patent Application No. 61/755,660, entitled, "SYSTEMS AND METHODS FOR TRACKING OBJECT MOVEMENTS IN THREE-DIMENSIONAL SPACE," filed 23 Jan. 2013. The provisional application is hereby incorporated by reference for all purposes.

FIELD OF THE TECHNOLOGY DISCLOSED

The technology disclosed relates, in general, to characterizing and tracking movements of an object, and in particular implementations, to determining positions and orientations of the moving object.

BACKGROUND

Motion capture has numerous applications. For example, in filmmaking, digital models generated using motion capture can be used to drive the motion of computer-generated characters or objects. In sports, motion capture can be used by coaches to study an athlete's movements and guide the athlete toward improved body mechanics. In video games or virtual reality applications, motion capture can be used to allow a person to interact with a virtual environment in a natural way, e.g., by waving to a character, pointing at an object, or performing an action such as swinging a golf club or baseball bat.

The term "motion capture" refers generally to processes that capture movement of a subject in three-dimensional (3D) space and translate that movement into, for example, a digital model or other representation. Motion capture is typically used with complex subjects that have multiple separately articulating members whose spatial relationships change as the subject moves. For instance, if the subject is a walking person, not only does the whole body move across space, but the position of arms and legs relative to the person's core or trunk are constantly shifting. Motion capture systems are typically interested in modeling this articulation.

Most existing motion-capture systems rely on markers or sensors worn by the subject while executing the motion and/or on the strategic placement of numerous cameras in the environment to capture images of the moving subject from different angles. Such systems tend to be expensive to construct. In addition, markers or sensors worn by the subject can be cumbersome and interfere with the subject's natural movement. Further, systems involving large numbers of cameras tend not to operate in real time, due to the volume of data that needs to be analyzed and correlated. Such considerations of cost, complexity and convenience have limited the deployment and use of motion-capture technology.

Consequently, there is a need for an economical approach that captures the motion of objects in real time without attaching sensors or markers thereto.

SUMMARY

The technology disclosed relates to tracking movement of a real world object in three-dimensional (3D) space. In particular, it relates to mapping, to image planes of a camera, projections of observation points on a curved volumetric model of the real world object. The projections are used to calculate a retraction of the observation points at different times during which the real world object has moved. The retraction is then used to determine translational and rotational movement of the real world object between the different times.

Implementations of the technology disclosed relate to methods and systems for capturing the motion of one or more objects in 3D space using, for example, a sphere model. In various implementations, an object is modeled as a sphere, or any other kind of closed, 3D curved volume, distributed so as to volumetrically approximate the contour of the object; computation of the position and orientation of the volume determines the shape and/or movement of the object. The approaches described herein capture the shape and/or movement of an object in 3D space and in real time without excessive cost or computational complexity. Although the ensuing discussion refers to sphere-based implementations for convenience of presentation, it should be understood that any type of closed, 3D curved volume such as ellipsoid, hyperboloid, etc. may be used instead, and all such volumes are within the scope of the technology disclosed.

In one implementation, the position and orientation of a sphere associated with an object of interest is determined based on multiple observation points projected from the sphere; the observation points may be obtained from, for example, light transmitted, reflected, or scattered from the sphere or shadows cast by the sphere. The observation points are first centrally projected onto multiple image sensors; the image sensors may be located on two parallel image planes offset from each other; the image planes include a first set of centrally projected points. A short time later, after the sphere has moved/rotated, a new set of points are centrally projected from the observation points of the sphere onto the same image planes. The location of the sphere center and the orientation of the sphere relative to the image planes can then be determined based on the two sets of centrally projected points and the geometry of the image planes captured by at least one camera. The 3D structure of the object and/or the movement thereof relative to the image sensors is reconstructed by determining the location and orientation of the sphere. In some implementations, the object is modeled as a collection of multiple spheres or any other closed curve. The structure and/or the movement of the object can then be reconstructed by assembling a collection of the determined locations and orientations of the multiple spheres.

In another implementation, the position and orientation of the object is fixed. Light emitted, reflected or scattered from the fixed object can be projected onto multiple image sensors that are embedded in a portable device (e.g., a smart phone). Utilizing the approaches as described above, a relative movement between the portable device and the fixed object can then be determined.

BRIEF DESCRIPTION OF THE DRAWINGS

In the drawings, like reference characters generally refer to the like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 8 is a flowchart showing a method of tracking movement and rotation of a sphere in accordance with implementations of the technology disclosed.

DESCRIPTION

Figure 1:
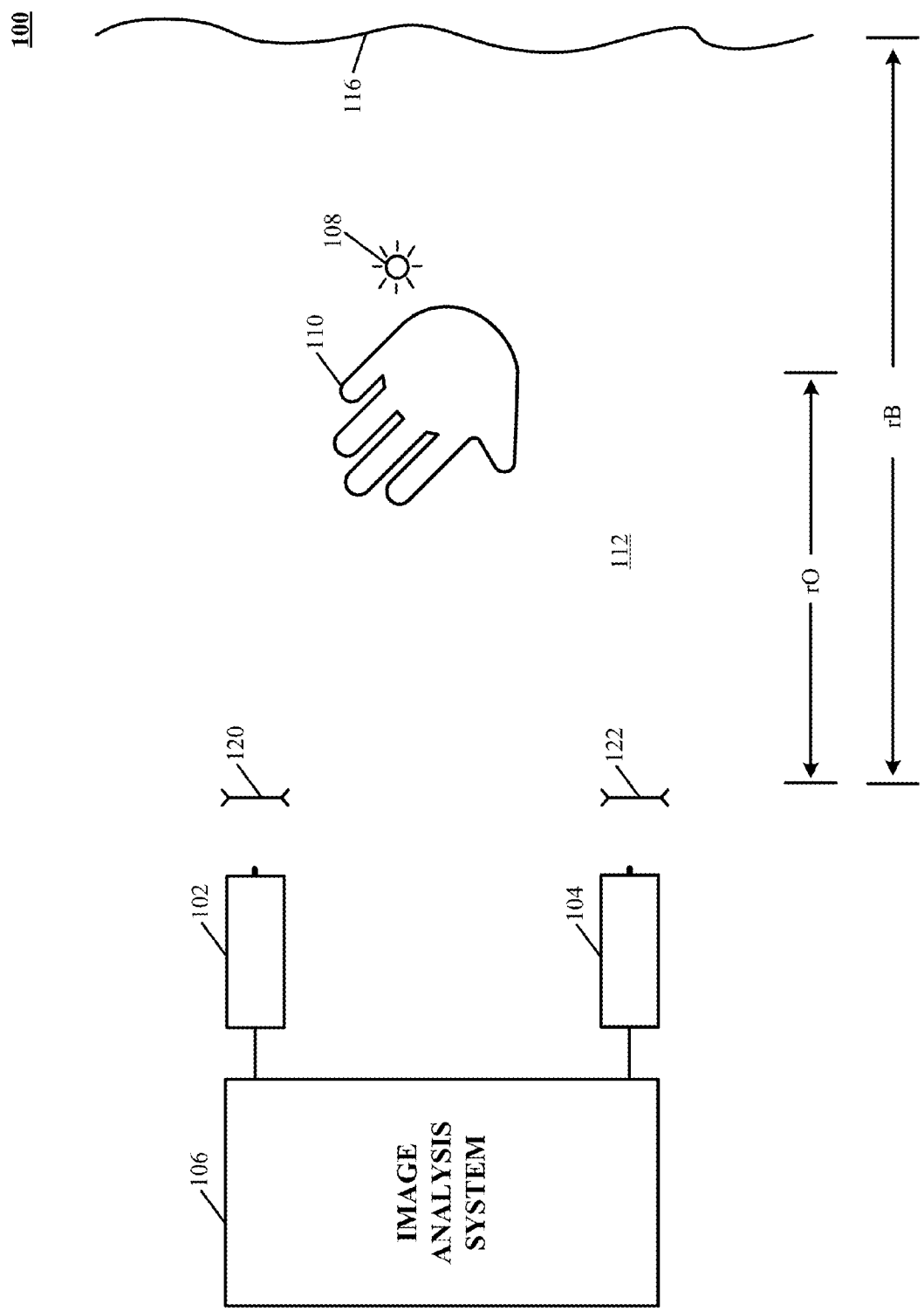
FIG. 1 illustrates a system for capturing image data according to an implementation of the technology disclosed.

Referring first to FIG. 1, which illustrates a system 100 for capturing image data according to an implementation of the technology disclosed. System 100 includes a pair of image sensors 102, 104 coupled to an image-analysis system 106. In one implementation, the image sensors are preferably deployed on a printed circuit board (PCB). In another implementation, the image sensors are employed in cameras; the cameras can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object, an image of a shadow cast by the object, an image of specular light spots reflected by the object, or an image of laser speckle projected on the object and representing that image in the form of digital data. While illustrated using an example two camera implementation, other implementations are readily achievable using different numbers of cameras or non-camera light sensitive image sensors or combinations thereof. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

The cameras are preferably capable of capturing video images (i.e., successive image frames at a constant rate of at least 15 frames per second), although no particular frame rate is required. The capabilities of the cameras are not critical to the technology disclosed, and the cameras can vary as to frame rate, image resolution (e.g., pixels per image), color or intensity resolution (e.g., number of bits of intensity data per pixel), focal length of lenses, depth of field, etc. In implementations, any cameras capable of focusing on objects within a spatial volume of interest can be used. For instance, to capture motion of the hand of an otherwise stationary person, the volume of interest might be defined as a cube approximately one meter on a side.

In some implementations, the illustrated system 100 includes a source 108, which can be disposed near or on an object 110, and controlled by the image-analysis system 106. In one implementation, the source 108 is a light source. For example, the light sources can be infrared light sources like infrared light-emitting diodes (LEDs) or lasers. The image sensors 102, 104 can be sensitive to infrared light or a characteristic light spectrum of the laser, respectively. Use of infrared light can allow the gesture-recognition system 100 to operate under a broad range of lighting conditions and can avoid various inconveniences or distractions that may be associated with directing visible light into the region where the person is moving. However, a particular wavelength or region of the electromagnetic spectrum is required. In addition, useful arrangements can include narrow- and wide-angle illuminators for different wavelength ranges. In one implementation, filters 120, 122 are placed in front of the image sensors 102, 104 to filter out visible light so that only infrared light is registered in the images captured by the image sensors 102, 104. In another implementation, the source 108 is a laser having low intensity, below a threshold capable of causing harm to a human. For example, the low-intensity lasers may have a low power (e.g., less than 1 mW) and/or a large area (e.g., larger than 10 mm$^2$) beam. In some implementations, additional optics (e.g., a lens or a diffuser) may be employed to widen the laser beam (and further weaken the laser intensity). The low-intensity laser beam is emitted towards the object 110; images of laser beams projected onto the object are then captured by the image sensors 102, 104.

In operation, the light source 108 is arranged to emit light towards a region of interest 112 in which an object of interest (e.g., a part of a human body such as a hand 110) that can sometimes also include a tool or other objects of interest can be present; the image sensors 102, 104 are oriented toward the region 112 to capture a light pattern of the object 110 or a portion of the specular beam projected onto the object 110. The image sensors 102, 104 can detect light transmitted, reflected, or scattered from the object 110. In some implementations, the operation of light source 108 and/or the image sensors 102, 104 is controlled by the image-analysis system 106, which can be, e.g., a computer system. Based on the captured images, image-analysis system 106 determines the position and/or motion of object 110.

Figure 2:
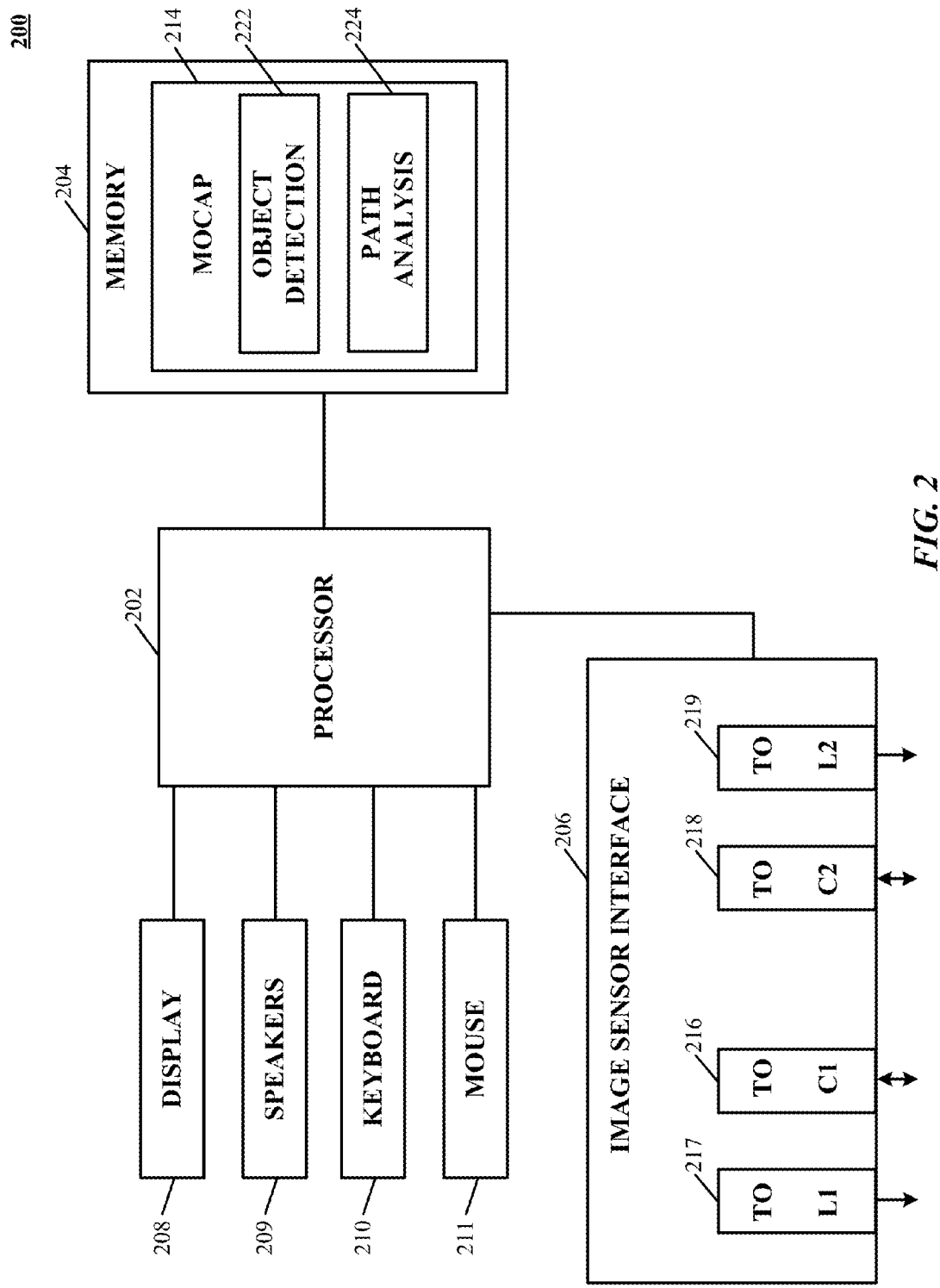
FIG. 2 is a simplified block diagram of a gesture-recognition system implementing an image analysis apparatus according to an implementation of the technology disclosed.

FIG. 2 is a simplified block diagram of a computer system 200, which implements image-analysis system 106 (also referred to as an image analyzer) according to an implementation of the technology disclosed. Image-analysis system 106 can include or consist of any device or device component that is capable of capturing and processing image data. In some implementations, computer system 200 includes a processor 202, a memory 204, an image sensor interface 206, a display 208, speakers 209, a keyboard 210, and a mouse 211. Memory 204 can be used to store instructions to be executed by processor 202 as well as input and/or output data associated with execution of the instructions. In particular, memory 204 contains instructions, conceptually illustrated as a group of modules described in greater detail below, that control the operation of processor 202 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 202 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

The image sensor interface 206 can include hardware and/or software that enables communication between computer system 200 and the image sensors 102, 104 shown in FIG. 1, as well as associated light sources such as the light source 108 of FIG. 1. Thus, for example, the image sensor interface 206 can include one or more data ports 216, 218 to which the image sensors can be connected, as well as hardware and/or software signal processors to modify data signals received from the image sensors (e.g., to reduce noise or reformat data) prior to providing the signals as inputs to a motion-capture ("mocap") program 214 executing on processor 202. In some implementations, the image sensor interface 206 can also transmit signals to the image sensors, e.g., to activate or deactivate the image sensors, to control the image sensors settings (image quality, sensitivity, etc.), or the like. Such signals can be transmitted, e.g., in response to control signals from processor 202, which may in turn be generated in response to user input or other detected events.

The image sensor interface 206 can also include controllers 217, 219, to which light sources (e.g., light source 108) can be connected. In some implementations, controllers 217, 219 supply operating current to the light sources, e.g., in response to instructions from processor 202 executing mocap program 214. In other implementations, the light sources can draw operating current from an external power supply (not shown), and controllers 217, 219 can generate control signals for the light sources, e.g., instructing the light sources to be turned on or off or changing the intensities. In some implementations, a single controller can be used to control multiple light sources.

Instructions defining mocap program 214 are stored in memory 204, and these instructions, when executed, perform motion-capture analysis on images supplied from the image sensors connected to the image sensor interface 206. In one implementation, mocap program 214 includes various processor-executed modules, such as an object-detection module 222 and an object-analysis module 224. Object-detection module 222 can analyze images (e.g., images captured via image sensor interface 206) to detect edges of an object therein and/or other information about the object's location. Object-analysis module 224 can analyze the object information provided by object detection module 222 to determine the 3D position and/or motion of the object (e.g., a user's hand). Examples of operations that can be implemented in code modules of mocap program 214 are described below. Memory 204 can also include other information and/or code modules used by mocap program 214.

Display 208, speakers 209, keyboard 210, and mouse 211 can be used to facilitate user interaction with computer system 200. These components can be modified as desired to provide any type of user interaction. In some implementations, results of light pattern capture using the image sensor interface 206 and mocap program 214 can be interpreted as user input. For example, a user can perform hand gestures that create light pattern; the light pattern are analyzed using mocap program 214, and the results of this analysis can be interpreted as an instruction to some other program executing on processor 202 (e.g., a web browser, word processor, or other application). Thus, by way of illustration, a user might use upward or downward swiping gestures to "scroll" a webpage currently displayed on display 208, to use rotating gestures to increase or decrease the volume of audio output from speakers 209, and so on.

It will be appreciated that computer system 200 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more image sensors may be built into the computer rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

Figure 3A:
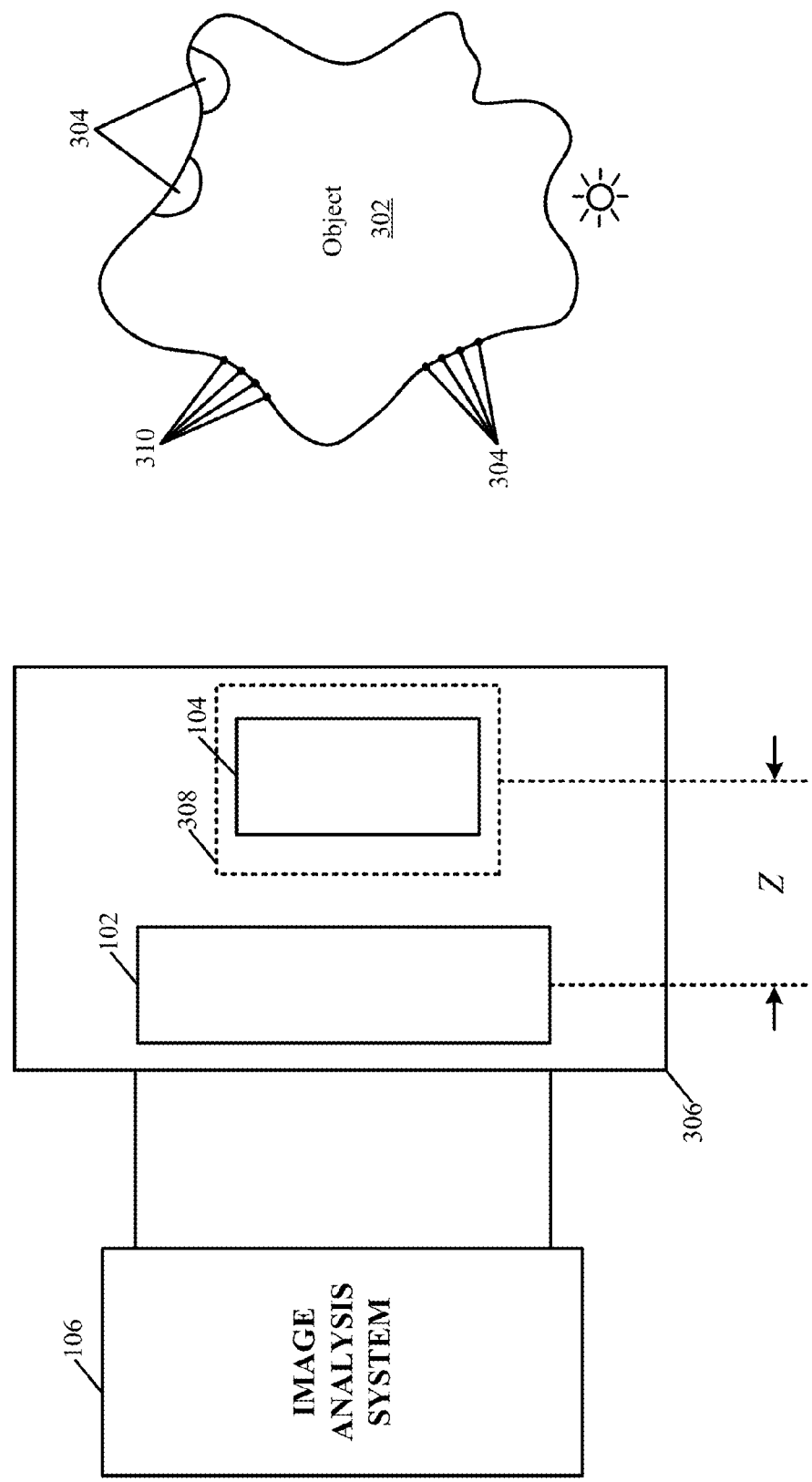
FIG. 3A shows one implementation of image sensors collecting light pattern images of an object of interest.
Figure 3B:
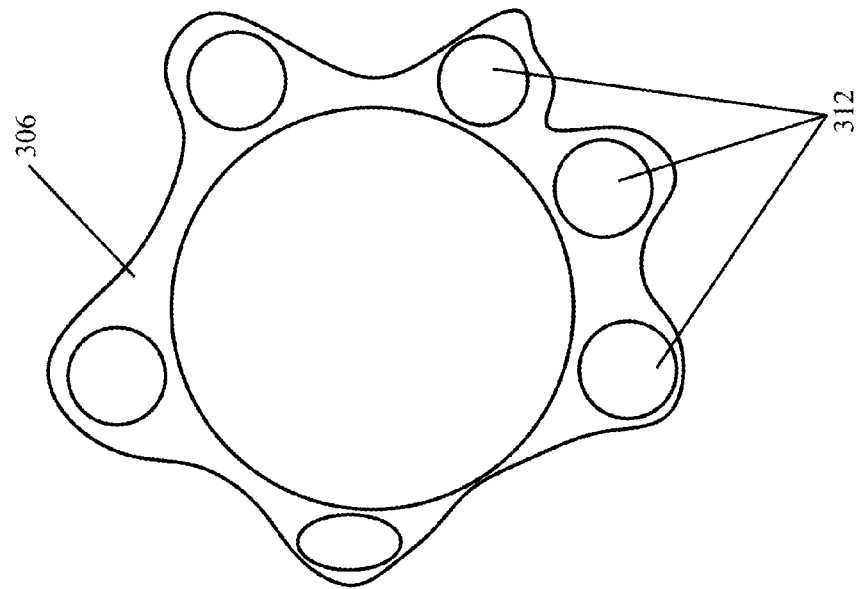
FIG. 3B illustrates one implementation of modeling an object or portions of an object as one or more volumetric spheres.
Figure 3B:
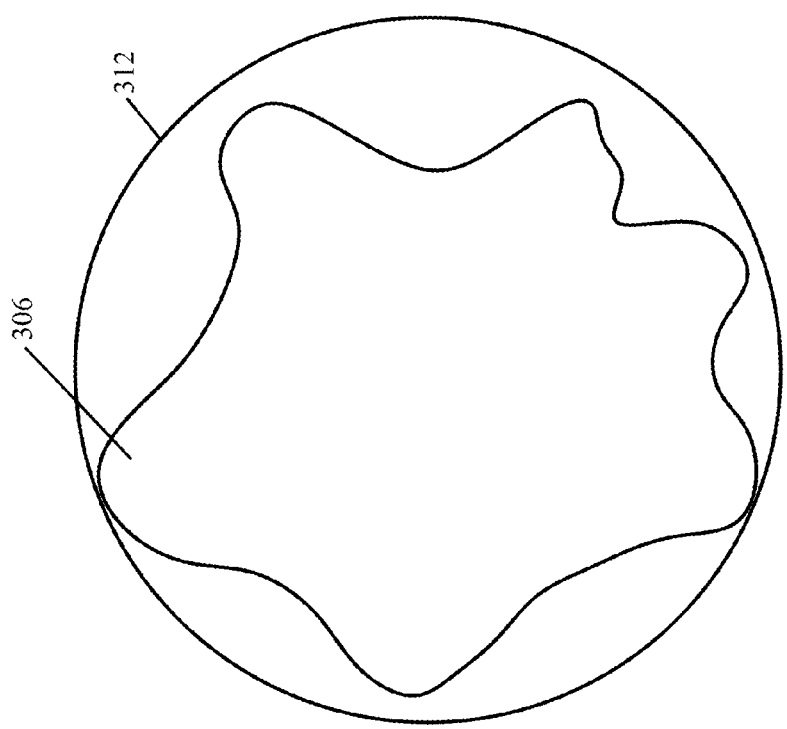

Referring to FIG. 3A, in various implementations, image sensors 102, 104 are operated to collect a sequence of light pattern images of the object 302 or specular light spots or shadows 304 projected onto the object 302. These images are then analyzed, e.g., using the image analysis system 106, to determine the object's position and shape in 3D space. In one implementation, the image sensors 102, 104 are deployed on a PCB base 306; the PCB base 306 includes a raised platform 308 so that the image sensors can detect light pattern images in a plane parallel to the base 306 with an offset distance z. The image sensors 102, 104 detect light patterns that are transmitted, reflected, or scattered from multiple (e.g., five or fewer) observation points 310 on surface of the object 302. Referring to FIG. 3B, the object 302 or parts of the object may be modeled as a sphere 312 or a collection of spheres 312, or other closed volumetric curve; by monitoring the translational and rotational motion of the sphere(s) 312, the position and orientation of the object 302 can be determined as further described below.

Figure 3C:
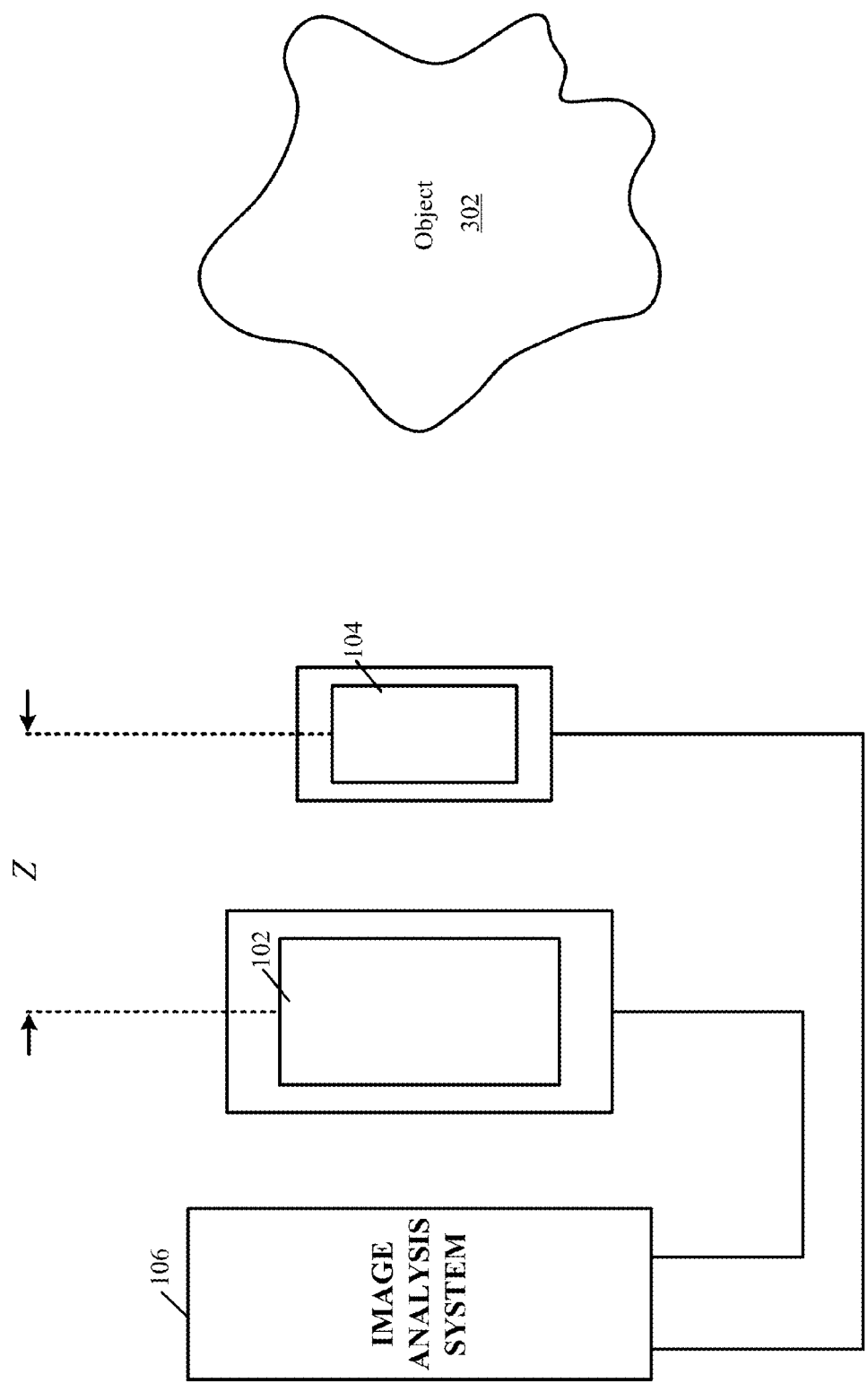
FIG. 3C is one implementation of image sensors being disposed on two parallel printed circuit board (PCB) bases.

FIG. 3C illustrates another implementation in which the image sensors 102, 104 are disposed on two PCB bases that are parallel and separated by a distance z. The configuration and/or number of PCB bases, however, is not limited to the implementations as described herein; the optimal configuration and/or number of PCB bases for a particular application is straightforwardly determined so that the image sensors 102, 104 can detect light pattern images cast from the object 302.

Figure 3D:
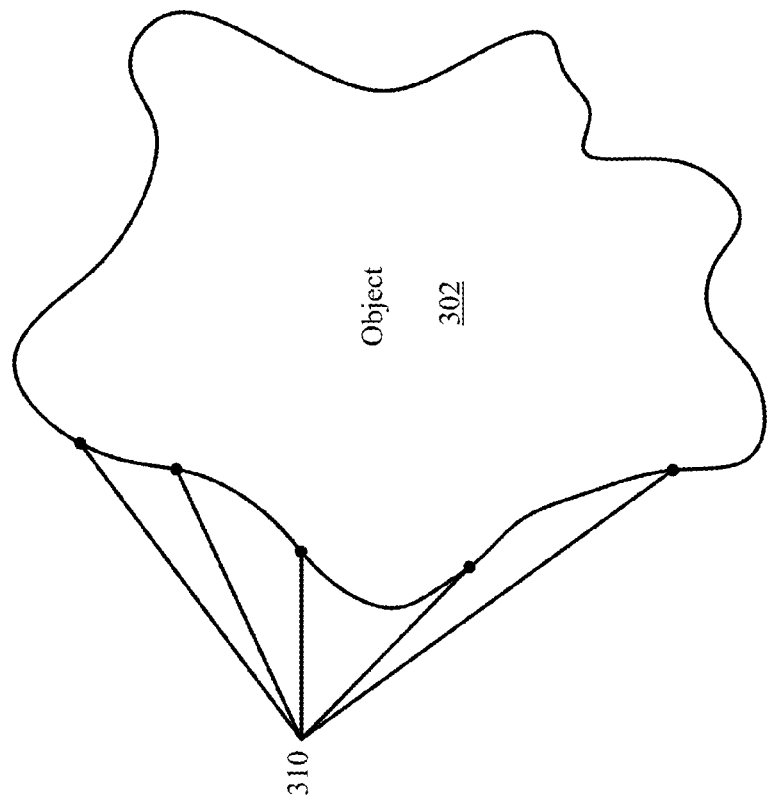
FIG. 3D illustrates one implementation of monitoring light patterns from observation points on an object using cameras with planar image sensors.
Figure 3D:
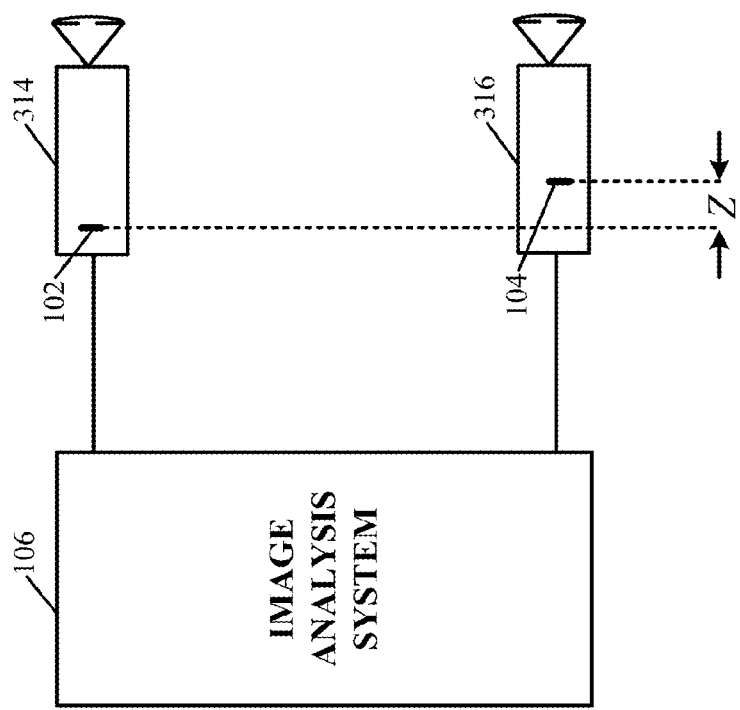
Figure 3E:
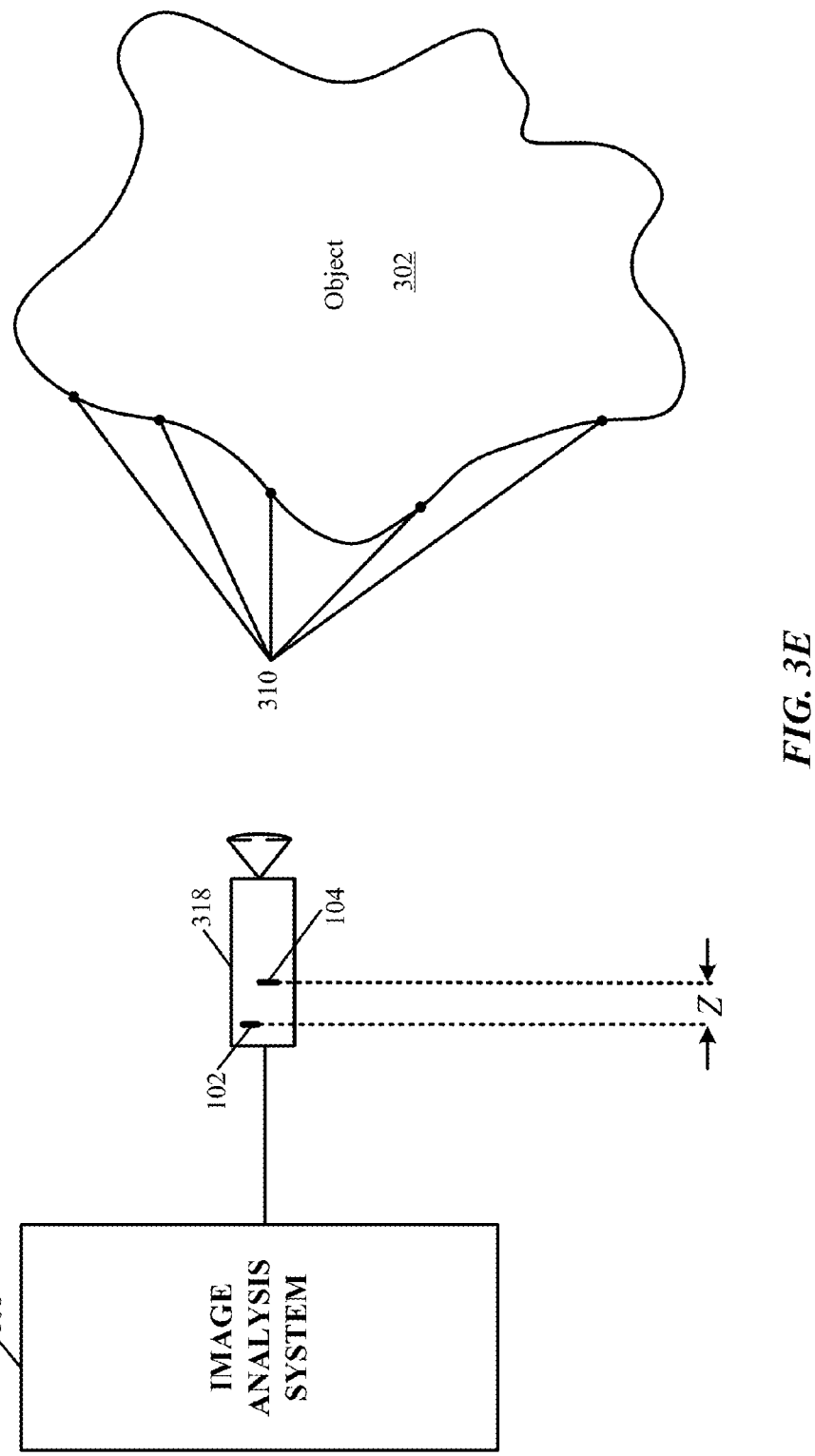
FIG. 3E shows one implementation of monitoring light patterns from observation points on an object using a single camera with planar image sensors.

In the implementation illustrated in FIG. 3D, the light patterns cast from the observation points are monitored using cameras 314, 316, each of which has a planar image sensor 102, 104. The planar image sensors 102, 104 are parallel and offset from each other by a distance z. Cameras 314, 316 thus project light pattern images of the observation points 310 from the object surface onto the planar image sensors 102, 104. In another implementation, a single camera is used to monitor the observation points 310 on the object surface. In the implementation illustrated in FIG. 3E, a single camera 318 includes two image sensors 102, 104 that are parallel but offset by a distance z; accordingly, light pattern images of the observation points 310 are projected onto two different planes defined by the image sensors 102, 104. The light pattern images of the observation points 310 acquired using either the single camera 318 or the dual cameras 314, 316 are then analyzed to determine the location and orientation of the object 302.

In various implementations, the object 302 is modeled as a single sphere or a collection of spheres 312; theoretically, an infinite number of spheres can be used to construct the 3D model of the object 302. In one implementation, the 3D model includes spheres that are close-packed (i.e., each sphere is tangent to adjacent spheres). Because the closed-packed spheres occupy the greatest fraction of space volume of the object 302 with a limited number of spheres, the shape and size of the object 302 can be accurately modeled with a fast processing time (e.g., milliseconds). If a higher detection resolution of the object 302 is desired, the number of spheres used to model the object 302 may be increased.

Figure 3F:
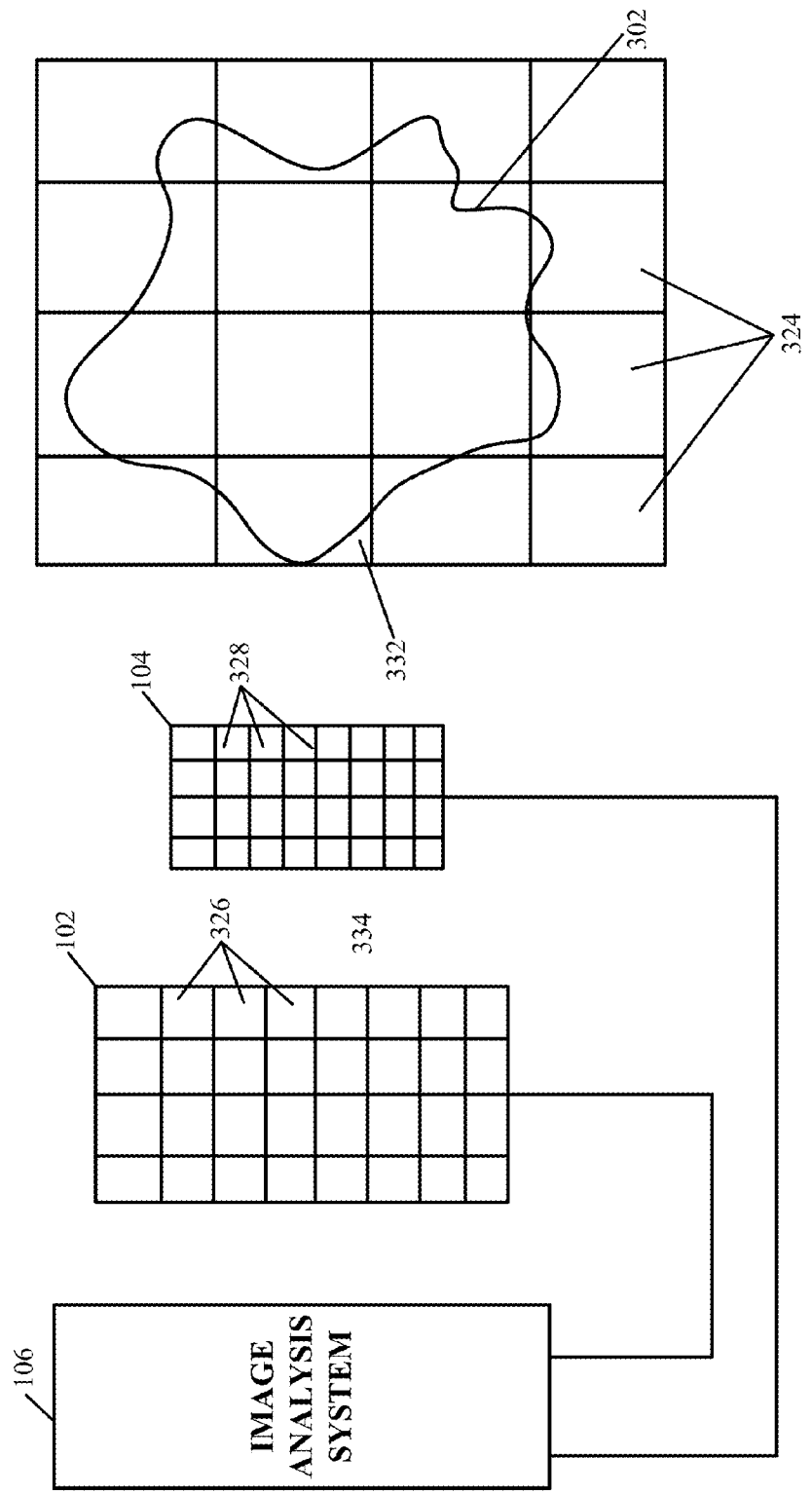
FIG. 3F illustrates one implementation of partitioning space within detection range of image sensors.
Figure 3G:
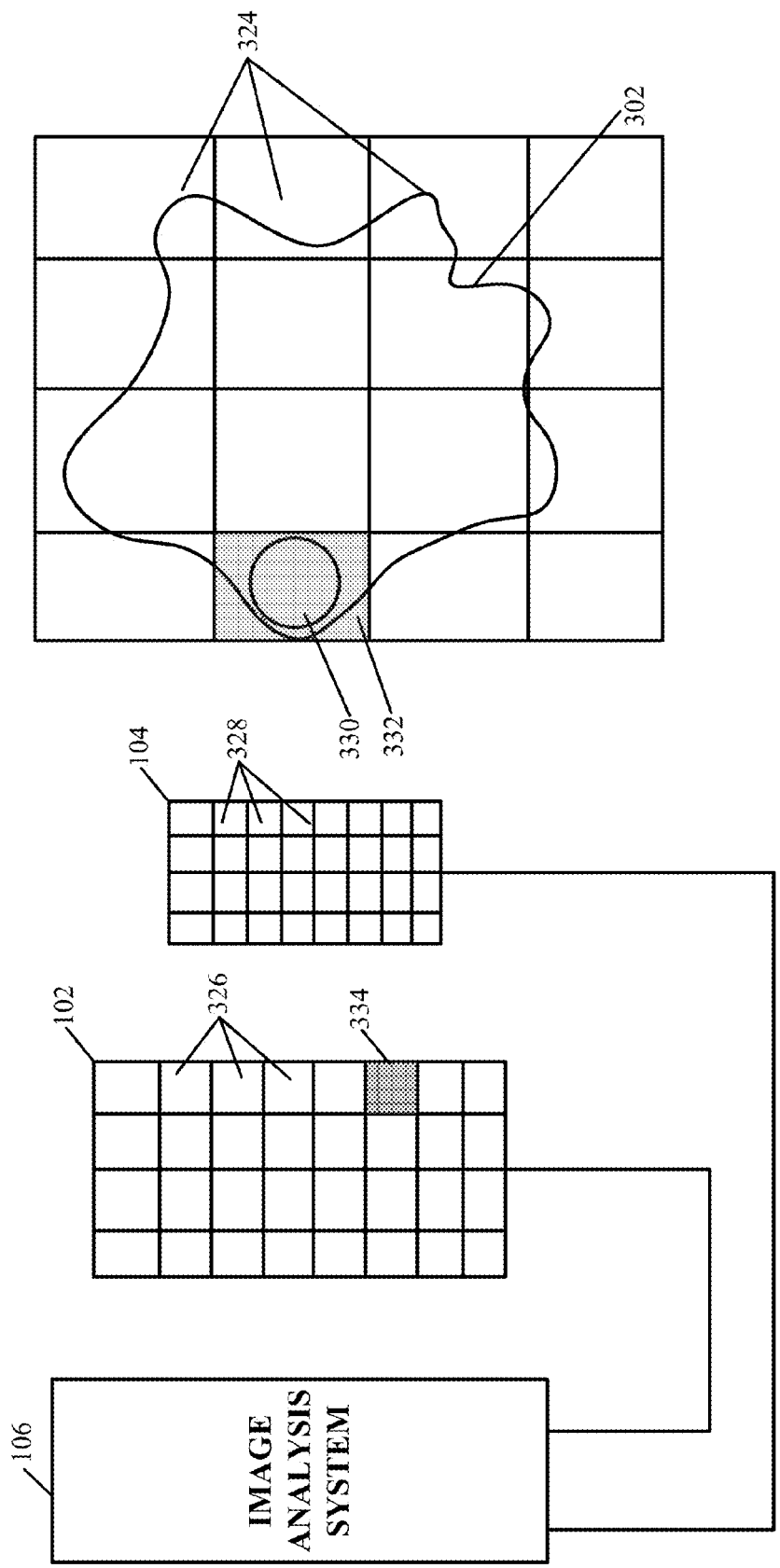
FIG. 3G is one implementation of grouping pixels in image sensors into multiple pixel regions that correspond to multiple spatial partitions.

FIG. 3F shows how space within the detection range of the image sensors 102, 104 may be divided into multiple partitions 324; a part of the object 302 in each partition 324 can be reconstructed using a sphere that fits the size and location thereof. A collection of spheres in the partitions 324 then determines the shape, size, and location of the object 302. As shown in FIG. 3G, pixels of image sensors 102, 104 may be grouped to form multiple regions 326, 328, each of which corresponds to a spatial partition 324. For example, light transmitted from a part 330 of the object 302 in the spatial partition 332 is projected onto the region 334 of the image sensor 102 to activate the pixels therein. Positions of the activated pixels in the region 334 can identify the location and/or size of the object part 330 by modeling it as, for example, a sphere 336. In one implementation, five pixels activated by the light transmitted, reflected, or scattered from the object 306 in the partition 332 are used to determine the location and/or size of the sphere 336. Movements of the activated pixels in the pixel region 334 can determine the motion of the sphere 336 (or the object part 330) within the spatial partition 332.

Movements of the activated pixels may result from a moving object part, or from a shape/size change of the object 302. In some implementations, object movements are identified based on the average movement of the activated pixels and a predetermined maximum threshold movement. If, for example, the average movement of the five activated pixels is within the predetermined maximum threshold, it can be inferred that the movements of the activated pixels result from a motion of the object and, consequently, object motion can be determined based on the movements of the five activated pixels. If, however, the average movement of the five activated pixels is larger than the predetermined maximum threshold, it can be inferred that the shape or size of the object part has changed and a new sphere is constructed to reflect this change. In some implementations, an angular rotation of the sphere is determined based on movement of one of the five activated pixels (e.g., the fifth activated pixel) in the image sensor. Again, if movement of the fifth activated pixel exceeds the predetermined threshold, a new sphere should be used to reconstruct the object.

A collection of spheres from the regions 326, 328 of the image sensors 102, 104, respectively, thus provides a reconstructed object in 3D space. Because the size and shape of each space partition may be adjusted based on a desired detection resolution and/or image-sensing speed, the size and shape of each region 326, 328 in the image sensors 102, 104 may be adjusted accordingly.

Referring again to FIG. 3B, in some implementations, the entire object 302 is modeled as a sphere 312; this simplifies tracking the movement of the object 302 in 3D space. In some implementations, there is more than one object within the detection range of the image sensors 102, 104; each object is modeled as, for example, a sphere or any other closed curve and its position, size and movement are independently tracked using, for example, five activated pixels in a corresponding region of the image sensor.

The object-tracking approach as described above determines the position and movement of the object 302 relative to the image sensors 102, 104. In various implementations, the position of the object 302 is fixed, and the same tracking approach is used to determine the relative locations and movements of the multiple sensors. For example, the object 302 may be any device or object that can transmit, reflect or scatter light and has a fixed position in 3D space; the image sensors or any type of sensors that can detect any signals transmitted, reflected, or scattered from the object 302 may be embedded in a portable device. By collecting, for example, signals (e.g., optical signals, acoustic signals, or any other electromagnetic signals) from the object 302, the movement of the image sensors (and thereby the portable device) relative to the object 302 can be determined using the same tracking approach as described above. For purpose of illustration, the image sensors herein are assumed to have fixed positions and the tracking approach is utilized to determine the movement of the object 302.

Figure 4A:
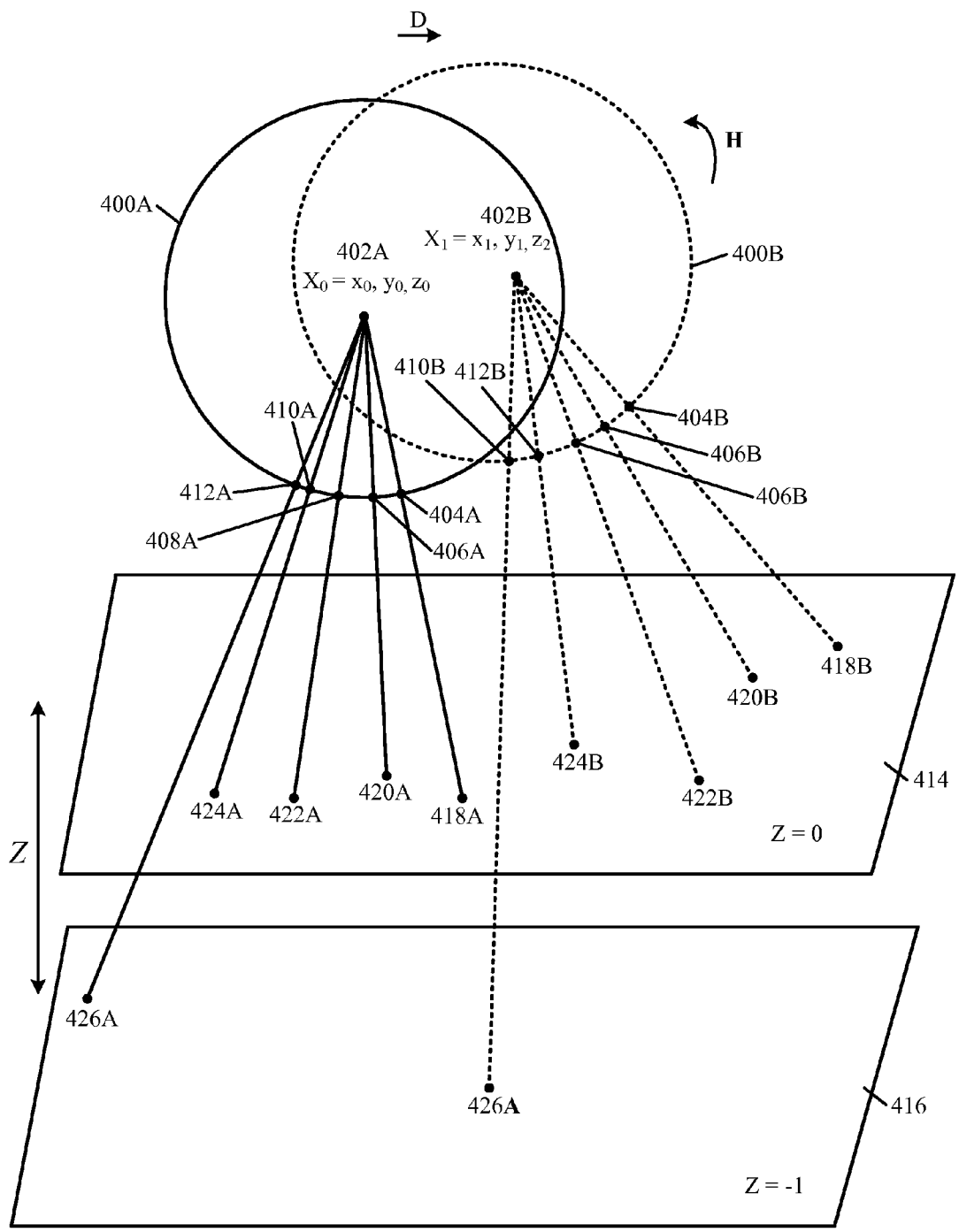
FIG. 4A depicts one implementation of capturing, in image planes of a camera, projections of observation points on a sphere model at times t0 and t1.

In various implementations, the object 302 is modeled as a sphere. Parameters that characterize the sphere (such as the location (x, y, z) of the sphere center in 3D space, the radius r and the rotational angle θ of the sphere 312) may be determined based on multiple observation points 310 on the sphere surface. In some implementations, five observation points on the sphere surface are monitored using the image sensors to determine the characteristic parameters of the sphere. Referring to FIG. 4A, at an initial time t=t0, a sphere 400A having a center 402A located at a position X0=(x0, y0, z0) in 3D space and with a rotational angle $\theta_0$ is tracked by indirectly monitoring a collection of, for example, five observation points 404A, 406A, 408A, 410A, 412A on the spherical surface. The rotational angle may be defined as an identity matrix of order 3, i.e., $$\theta_0 = \begin{bmatrix} 1 & 0 & 0 \\ 0 & 1 & 0 \\ 0 & 0 & 1 \end{bmatrix}$$

In one implementation, four of the observation points 404A, 406A, 408A, 410A are centrally projected onto a first image plane 414 (e.g., the xy-plane at z=0), and the fifth observation point 412A is centrally projected onto a second image plane 416 that is parallel but offset from the first image plane 414 by a distance z (e.g., the xy-plane at z=1).

For example, the points 418A, 420A, 422A, 424A which are centrally projected from the observation points 404A, 406A, 408A, 410A, respectively, onto the first image plane 414 can be defined by intersecting lines that connect the spherical center 402A with the observation points 404A, 406A, 408A, 410A, respectively, with the image plane 414; similarly, point 426A is centrally projected from the fifth observation point 412A onto the image plane 416 by intersecting the line that connects the sphere center 402A and the observation point 412A with the image plane 416.

As used herein, a collection of the centrally projected points 418A, 420A, 422A, 424A in the first image plane 414 is defined as a first set of projected points P0 at t=t0, and the centrally projected point 426A in the second image plane 416 is defined as a projected point q0 at t=t0. In a short time interval, Δt=t1−t0 (e.g., 10 ms), the sphere 400A may move to a new location as indicated by sphere 400B, the movement occurring over a distance D and/or through a rotational angle Δθ; this results in the spherical center 402B being located in a new position X1=(x1, y1, z1) and having a new rotational angle, $\theta_1 = \theta_0 + \Delta\theta$, and the five observation points 404A, 406A, 408A, 410A, 412A displaced to new positions 404B, 406B, 408B, 410B, 412B, respectively. Accordingly, points in the image planes 414, 416 that are centrally projected from the points 404B, 406B, 408B, 410B, 412B are located at new positions 418B, 420B, 422B, 424B, 426B in the image planes 414, 416, respectively, due to the movement of the sphere. Again, a second set of centrally projected points P1 at t=t1 is defined by a collection of the points 418A, 420A, 422A, 424A in the image plane 414, and the projected point q1 in the image plane 416 at t=t0 is defined by the point 426A.

Figure 4B:
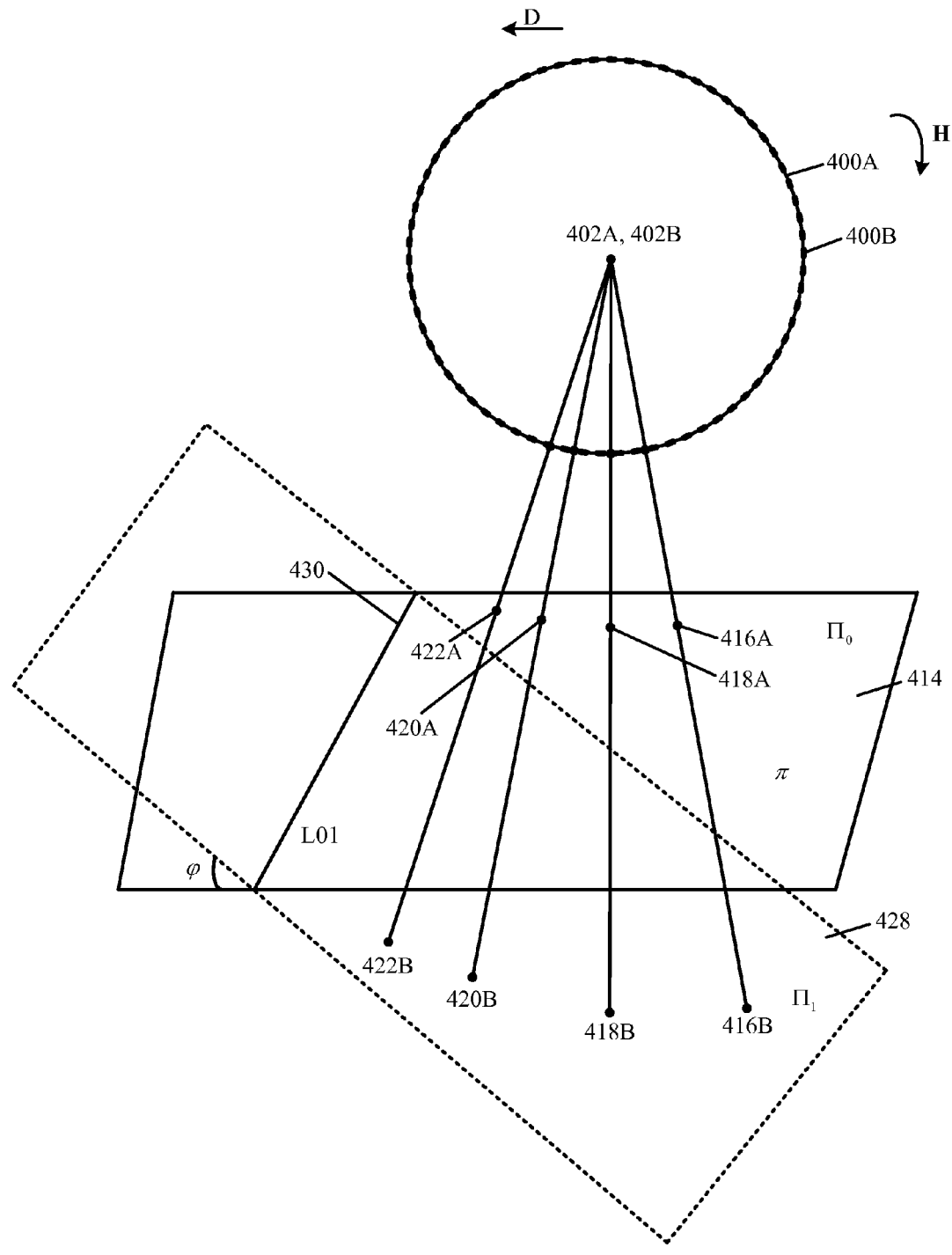
FIG. 4B illustrates one implementation of calculating a refraction of four perimeter observation points at time t1 to their positions at t0.

Referring to FIG. 4B, in some implementations, information characterizing movement of the sphere in the short time interval Δt, as well as parameters that characterize the sphere, are determined based on the relationship between the two sets of centrally projected points P0 and P1 obtained at t0 and t1, respectively. In one implementation, the sphere 400B is retracted to the position and orientation of the sphere 400A at time t=t0. The radius r of the sphere is assumed to have a constant value at t=t0 and t=t1=t0+Δt and the sphere center is located at the origin, i.e., (x0, y0, z0)=O=(0, 0, 0). Accordingly, an image plane 428 upon which the second set of the centrally projected points P1 (i.e., 418B, 420B, 422B, 424B) is located is tilted at an angle φ with respect to the image plane 414; the image planes 414, 428 are denoted as $\Pi_0$, $\Pi_1$, respectively, and intersect at a line L01 indicated at 430. In some implementations, the retraction of the sphere can be achieved by rescaling the positions of the observation points based on the distances between the sets of centrally projected points P0, P1 and the sphere centers X0, X1 at t=t0 and t=t1, respectively (i.e., $\|P_0 - X_0\|$ and $\|P_1 - X_1\|$). The relationship between the two sets of centrally projected points P0, P1 located in the image planes $\Pi_0$, $\Pi_1$, respectively, may then be determined based on two mapping matrices, $\rho_1^0$ and $\rho_0^1$, as further described below. Similarly, referring to FIG. 4C, upon retracting the movement of the sphere, an image plane 431 in which the centrally projected point 426B (q1) is located is tilted at an angle φ with respect to the image plane 416 in which the centrally projected point 426A (q0) is located.

The mapping matrix $\rho_1^0$ maps the points in the image plane $\Pi_0$ to the points in the image plane $\Pi_1$ (i.e., $\rho_1^0 : \Pi_0 \to \Pi_1$). In various implementations, this is achieved by creating a line connecting a point π in the image plane $\Pi_0$ (i.e., $\pi \in \Pi_0$) with the origin, O(0, 0, 0), and intersecting the line with the image plane $\Pi_1$. In one implementation, the set of centrally projected points P0 in the plane $\Pi_0$ is selected to map to the image plane $\Pi_1$; as a result, the mapped points of P0 onto the image plane $\Pi_1$ are the set of projected points P1. The mapping matrix can then be expressed as: $\rho_1^0 : P_0 \mapsto P_1$. Using this mapping principle, the mapping matrix $\rho_1^0$ can also map lines in the image plane $\Pi_0$ to lines in the image plane $\Pi_1$. The mapping between the sets of projected points P0, P1 or lines in the image planes $\Pi_0$, $\Pi_1$ may be a linear transformation that satisfies two equations:

$$\rho_1^0(v_1 + v_2) = \rho_1^0(v_1) + \rho_1^0(v_2) \qquad (1),$$

$$\rho_1^0(\alpha v) = \alpha \rho_1^0(v) \qquad (2),$$

where $v_1$ and $v_2$ are any vectors in the image plane $\Pi_0$, and α is a scalar value. Therefore, the mapping matrix $\rho_1^0$ can be constructed based on the two sets of centrally projected points P0, P1. Similarly, the inverse mapping matrix $\rho_1^0 : \Pi_1 \to \Pi_0$, which maps points in the image plane $\Pi_1$ onto points in the image plane $\Pi_0$ by creating a line that connects a point in the plane $\Pi_1$ to the origin, O(0, 0, 0), and intersecting the line with the image plane $\Pi_0$, can be easily constructed based again on the centrally projected points P0, P1. The parameters that characterize the position, rotation, and movement of the sphere can then be extracted from the mapping matrices $\rho_1^0$ and $\rho_0^1$ as further described below.

In some implementations, however, the mapping matrices $\rho_1^0$ and $\rho_0^1$ are neither linear nor affine transformations that preserve lines and parallelism (i.e., mapping parallel lines to parallel lines) during the mapping. In fact, there may be points in the image plane $\Pi_0$ that fail to map onto the image plane $\Pi_1$. For example, referring to FIG. 4D, a line that connects the origin O with a point $\pi_i$ in the plane $\Pi_0$ is parallel to the plane $\Pi_1$, thereby failing to be mapped onto the image plane $\Pi_1$.

Figure 4C:
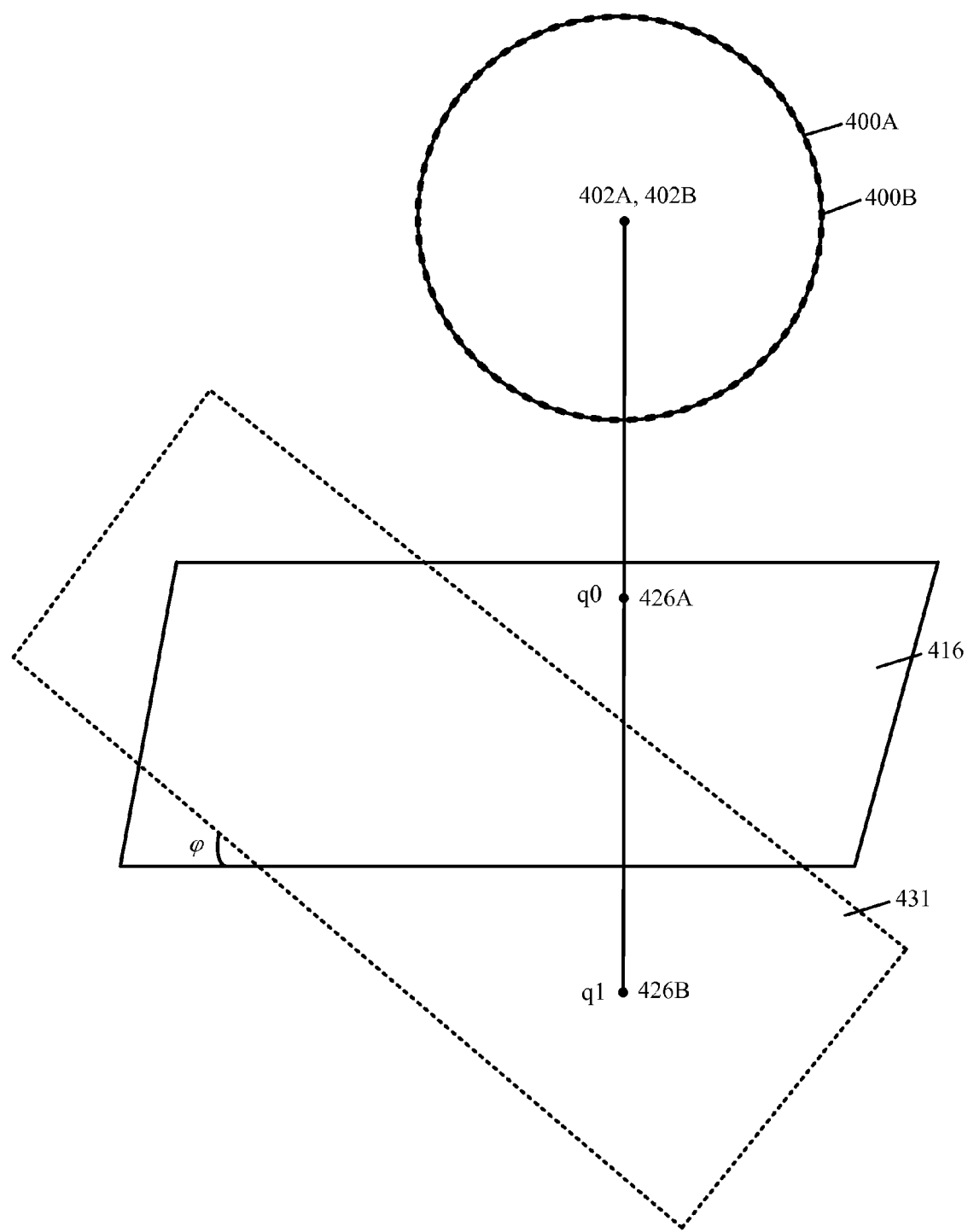
FIG. 4C shows one implementation of determining a translation of a sphere model between times t0 and t1.
Figure 4D:
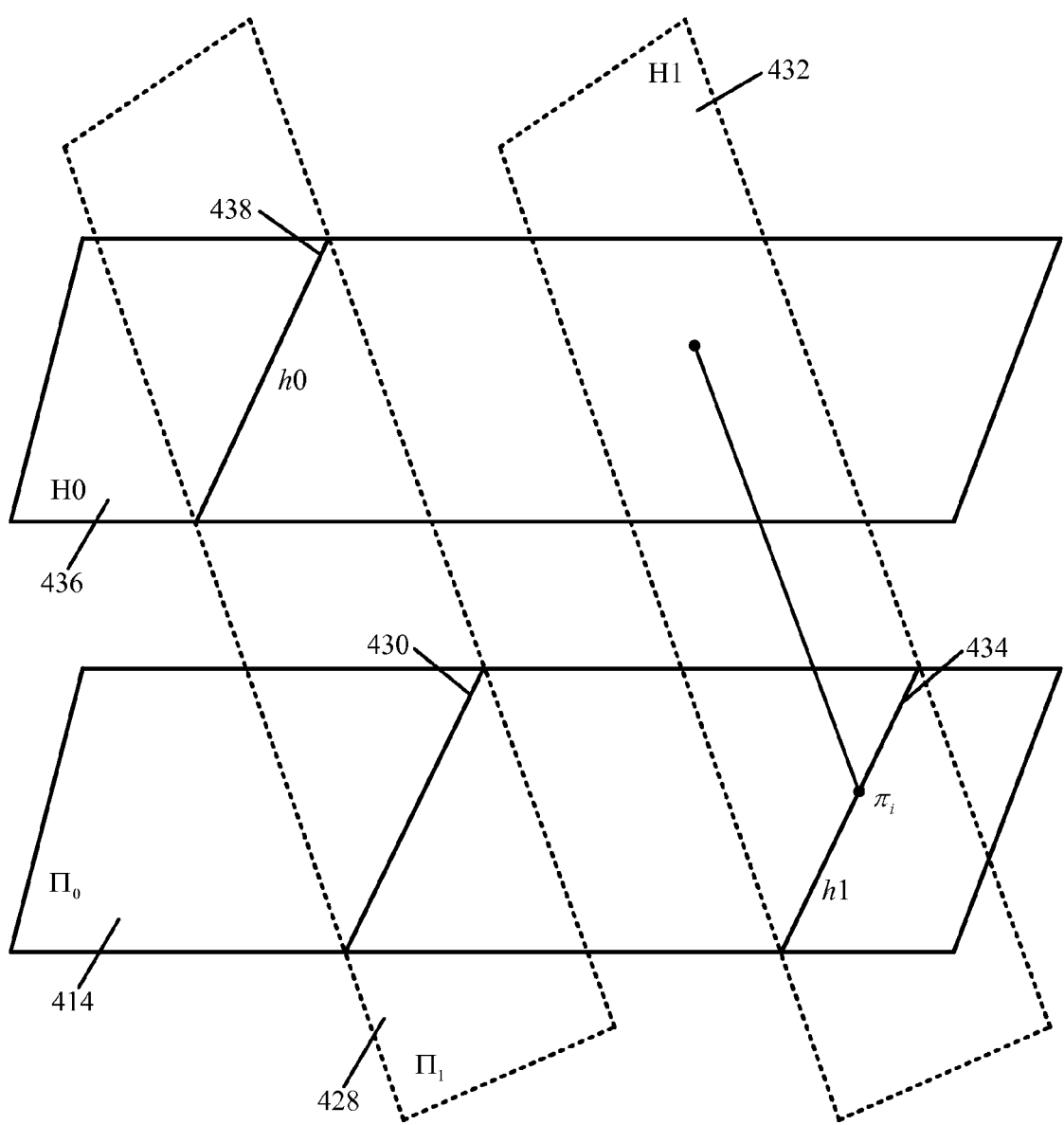
FIG. 4D is one implementation of determining positions of centers of a sphere model at the times t0 and t1.
Figure 4E:
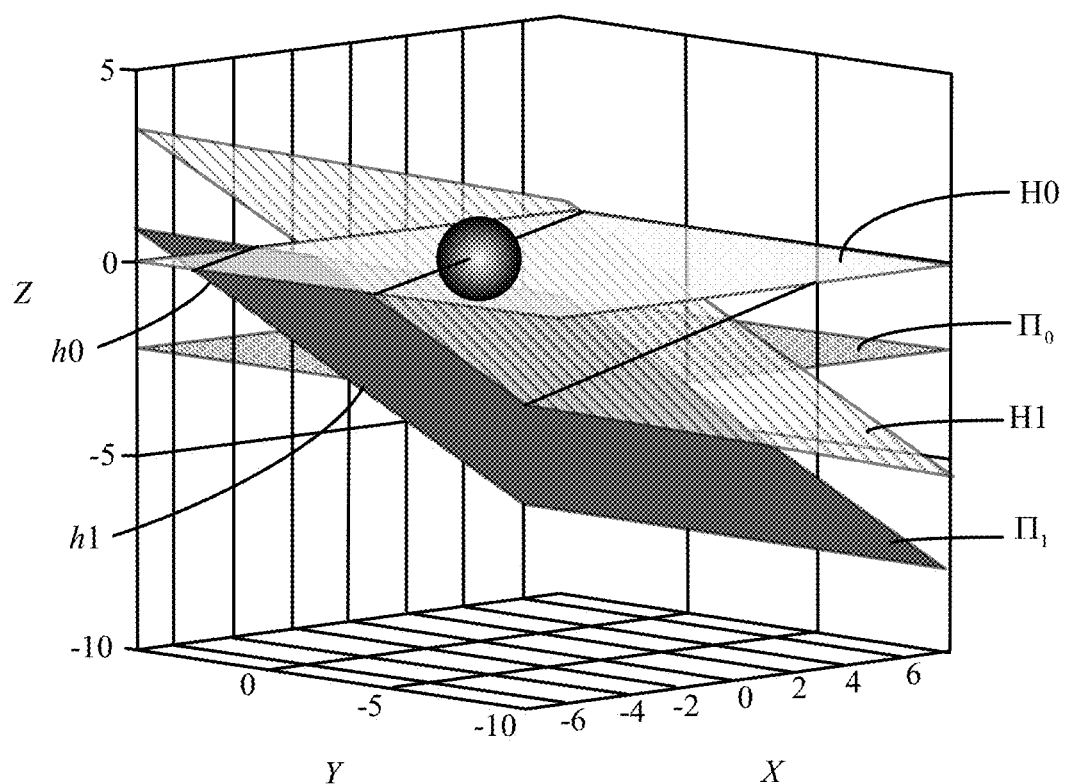
FIG. 4E illustrates one implementation of a configuration of a sphere model, image planes, and vanishing planes.

In some implementations, any set of points in a plane H1 (indicated at 432) that contains the origin O and is parallel to the plane $\Pi_1$ do not map onto the image plane $\Pi_1$; the plane H1 may thus be defined as a "vanishing plane" for the central projection from the sphere to $\Pi_1$. If the image planes $\Pi_0$ and $\Pi_1$ are not parallel, points on a horizon line (or line at infinity) h1 (indicated at 434) defined by the intersection of the plane $\Pi_0$ with the vanishing plane H1 fail to be mapped to the image plane $\Pi_1$. Similarly, points in a plane H0 (indicated at 436) that contains the origin O and is parallel to the image plane $\Pi_0$ cannot be mapped onto the image plane $\Pi_1$ since the planes H0 and $\Pi_1$ are parallel; the horizon line (or line at infinity) 438 defined by the intersection between plane $\Pi_1$ and the vanishing plane H0 is denoted as h0. FIG. 4E depicts a configuration of the sphere, image planes $\Pi_0$, $\Pi_1$, and the vanishing planes H0, H1 corresponding to $\Pi_0$, $\Pi_1$, respectively, in 3D space.

In various implementations, the projective transformations that preserve the incidence and cross-ratio of the mapping lines but not necessarily their parallelism are used to obtain the mapping matrices $\rho_1^0$ and $\rho_0^1$ of all points in the image planes $\Pi_0$ and $\Pi_1$, respectively. Any plane having ordinary Cartesian coordinates in a standard 3D space can be transformed by an invertible 3×3 matrix using homogeneous coordinates in a projective space. In addition, parallel planes that do not intersect (or intersect at "infinity") in the standard 3D space can be transformed to projective planes that intersect in the projective space using the projective transformation. For example, parallel planes $\Pi_1$ and H1 can be converted to projective planes $\overline{\Pi}_1$ and $\overline{H}_1$, respectively, that intersect; accordingly, the projective transformation allows derivations of the mapping matrices $\rho_1^0$ and $\rho_0^1$.

In one implementation, the projective plane $\Re(P^2)$ is defined as a space containing all lines passing through the origin O in Euclidean 3-space $\Re^3$. A line $\{t \cdot (x, y, z) | t \in \Re\}$ in the homogeneous coordinate system of the Euclidean space is assigned coordinates [x, y, z] if $(x, y, z) \neq (0, 0, 0)$. Additionally, the line [x, y, z] is defined as being equal to [u, v, w] if there is a nonzero real number t for which $(x, y, z) = (tu, tv, tw)$. Accordingly, when $z \neq 0$, [x:y:z] can be written as $$\left[\frac{x}{z} : \frac{y}{z} : 1\right];$$

similarly, when $y \neq 0$, $$[x:y:z] = \left[\frac{x}{y} : 1 : \frac{z}{y}\right]$$

and when $x \neq 0$, $$[x:y:z] = \left[1 : \frac{y}{x} : \frac{z}{x}\right].$$

In various implementations, the projective plane includes multiple subset planes $\{[x:y:1]|x, y \in \Re\}, \{[x:1:z]|x, z \in \Re\}, \{[1:y:z]|y, z \in \Re\}$; each subset represents a copy of the finite (or affine) plane and has a complement line (i.e., $\{[x:y:0]|x, y \in \Re\}, \{[x:0:z]|x, z \in \Re\}, \{[0:y:z]|y, z \in \Re\}$, respectively) that is a copy of the projective line $\Re(P^1)$, also called "the line at infinity."

When an affine mapping matrix is expressed as w=Av+b in the projective plane, where w, v, b are vectors in the plane and A is a two-dimensional (2D) linear mapping, the corresponding projective mapping can be constructed by converting vector coordinates into homogeneous coordinates. Particularly, for vectors, affine coordinates are appended by the homogenizing coordinate "1" and the offset (or the inhomogeneous term, e.g., b) is folded into the linear mapping, as shown in equations (3) and (4).

$$\begin{bmatrix} w_x \\ w_y \end{bmatrix} = \begin{bmatrix} A_{xx} & A_{xy} \\ A_{yx} & A_{yy} \end{bmatrix} \begin{bmatrix} v_x \\ v_y \end{bmatrix} + \begin{bmatrix} b_x \\ b_y \end{bmatrix}, \tag{3}$$

$$\begin{bmatrix} w_x \\ w_y \\ 1 \end{bmatrix} = \begin{bmatrix} A_{xx} & A_{xy} & b_x \\ A_{yx} & A_{yy} & b_y \\ 0 & 0 & 1 \end{bmatrix} \begin{bmatrix} v_x \\ v_y \\ 1 \end{bmatrix}. \tag{4}$$

Eq. (3) represents an inhomogeneous form of the mapping matrix whereas Eq. (4) represents a homogeneous form of the same mapping matrix.

In various implementations, a projective transformation (e.g., 2D) is expressed as a 3×3 matrix constructed based on the same principles as describe above. Because of the arbitrary scale factor in the definition of the homogeneous coordinates, there are eight parameters, rather than the nine parameters, required to define the 2D linear projective transformation. In one implementation, information about these eight parameters is obtained from the two sets of points, P0, P1, centrally projected onto the image planes $\Pi_0$ and $\Pi_1$, respectively. For example, suppose the acquired projected points of P0 and P1 are given as:

$$P_0 = \begin{bmatrix} x \\ y \end{bmatrix}_0 = \begin{bmatrix} 0.24078 & 0.59101 & 0.80300 & 0.49654 \\ 0.48684 & 0.38450 & 0.66520 & 0.87281 \end{bmatrix}, \tag{5}$$

$$P_1 = \begin{bmatrix} x \\ y \end{bmatrix}_1 = \begin{bmatrix} -0.87354 & -0.32131 & 0.28201 & -0.15563 \\ -3.071292 & -4.07336 & -3.20744 & -2.0261 \end{bmatrix}. \tag{6}$$

To determine the mapping matrices $\rho_1^0$ and $\rho_0^1$, two stages of computation may be used. In a first stage, two initial transformations $fP_0$, $fP_1$ are computed by applying a canonical frame (i.e., $$\begin{bmatrix} 0 & 1 & 1 & 0 \\ 0 & 0 & 1 & 1 \end{bmatrix})$$

to the centrally projected point sets P0 and P1; this can be expressed as:

$$fP_0 = \text{Transform}(P_0) \tag{7},$$

$$fP_1 = \text{Transform}(P_1) \tag{8}.$$

In a second stage, $\rho_1^0$ is determined by applying the forward initial transformation of P1, i.e., $fP_1$, to the inverse initial transformation of P0, i.e., $(fP_0)^{-1}$; similarly, $\rho_0^1$ is determined by applying the forward initial transformation of P0, i.e., $fP_0$, to the inverse initial transformation of P1, i.e., $(fP_1)^-$. This can be given as:

$$\rho_1^0 = fP_1 \times (fP_0)^{-1} \tag{9},$$

$$\rho_0^1 = fP_0 \times (fP_1)^{-1} \tag{10}.$$

where the operator "×" refers to matrix multiplication, and the notation $(A)^{-1}$ refers to matrix inversion. As a result, $\rho_1^0$ and $\rho_0^1$ can be expressed as:

$$\rho_1^0 = \begin{bmatrix} 1.84017 & 0.61053 & -1.61385 \\ -0.92731 & 2.93033 & -4.27462 \\ -0.17426 & 0.30899 & 0.89153 \end{bmatrix}, \quad (11)$$

$$\rho_0^1 = \begin{bmatrix} 0.50197 & -0.13310 & 0.27047 \\ 0.20057 & 0.17348 & 1.19485 \\ 0.02860 & -0.08614 & 0.76042 \end{bmatrix}. \quad (12)$$

Because the third homogeneous coordinate of a mapping matrix represents a potential denominator, the third rows of the projective transformations $\rho_1^0$ and $\rho_0^1$ give horizon lines h1 and h0, respectively, that are mapped to infinity. In this example, the line $$0.17426x + 0.30899y + 0.89153 = 0 \quad (13),$$

in the image plane $\Pi_0$ is mapped to infinity by the mapping matrix $\rho_1^0$, and is the horizon line $h_1$; similarly, the line $$0.02860x - 0.08614y + 0.76042 = 0 \quad (14).$$

in the image plane $\Pi_1$ is mapped to infinity by the inverse mapping matrix $\rho_0^1$, and is the horizon line $h_0$. Accordingly, data from the sets of centrally projected points $P_0$ and $P_1$ can determine the mapping matrices $\rho_1^0$, $\rho_0^1$ and horizon lines $h_1$, $h_0$.

Figure 5A:
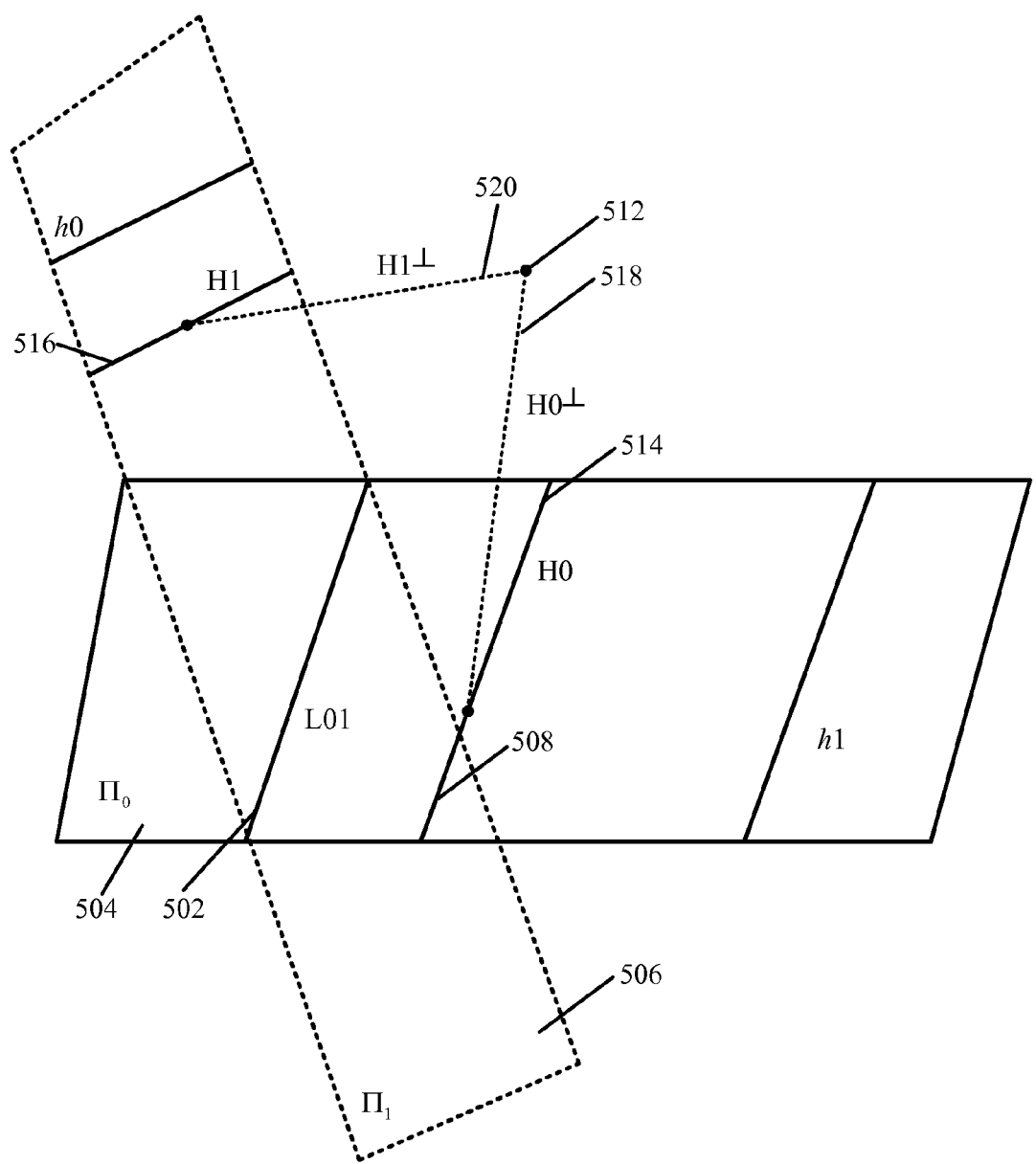
FIG. 5A shows one implementation of determining an intersection line between a first and second image plane of a camera.

Referring to FIG. 5A, in some implementations, additional information such as the intersection line L01 502 between the image planes $\Pi_0$ 504 and $\Pi_1$ 506 (i.e., $L_{01} = \Pi_0 \cap \Pi_1$) is required to determine the positions of the sphere center. In one implementation, the intersection line L01 (indicated at 502) is determined based on the geometry of the image planes $\Pi_0$, $\Pi_1$ and their corresponding vanishing planes H0, H1. To solve for L01, lines that contain orthogonal projection points 508, 510 of the sphere center 512 in the planes $\Pi_0$ and $\Pi_1$, respectively, are first determined. However, there are infinite numbers of lines that pass through the projection points 508, 510 in the image planes $\Pi_0$ and $\Pi_1$, respectively. To simplify the calculation, in one implementation, a line H0 that passes through the projection point 508 and is parallel to the horizon line h1 in the image plane $\Pi_0$ is selected; similarly, a line H1 that passes through the projection point 510 and is parallel to the horizon line h0 in the image plane $\Pi_1$ is chosen.

Figure 5B:
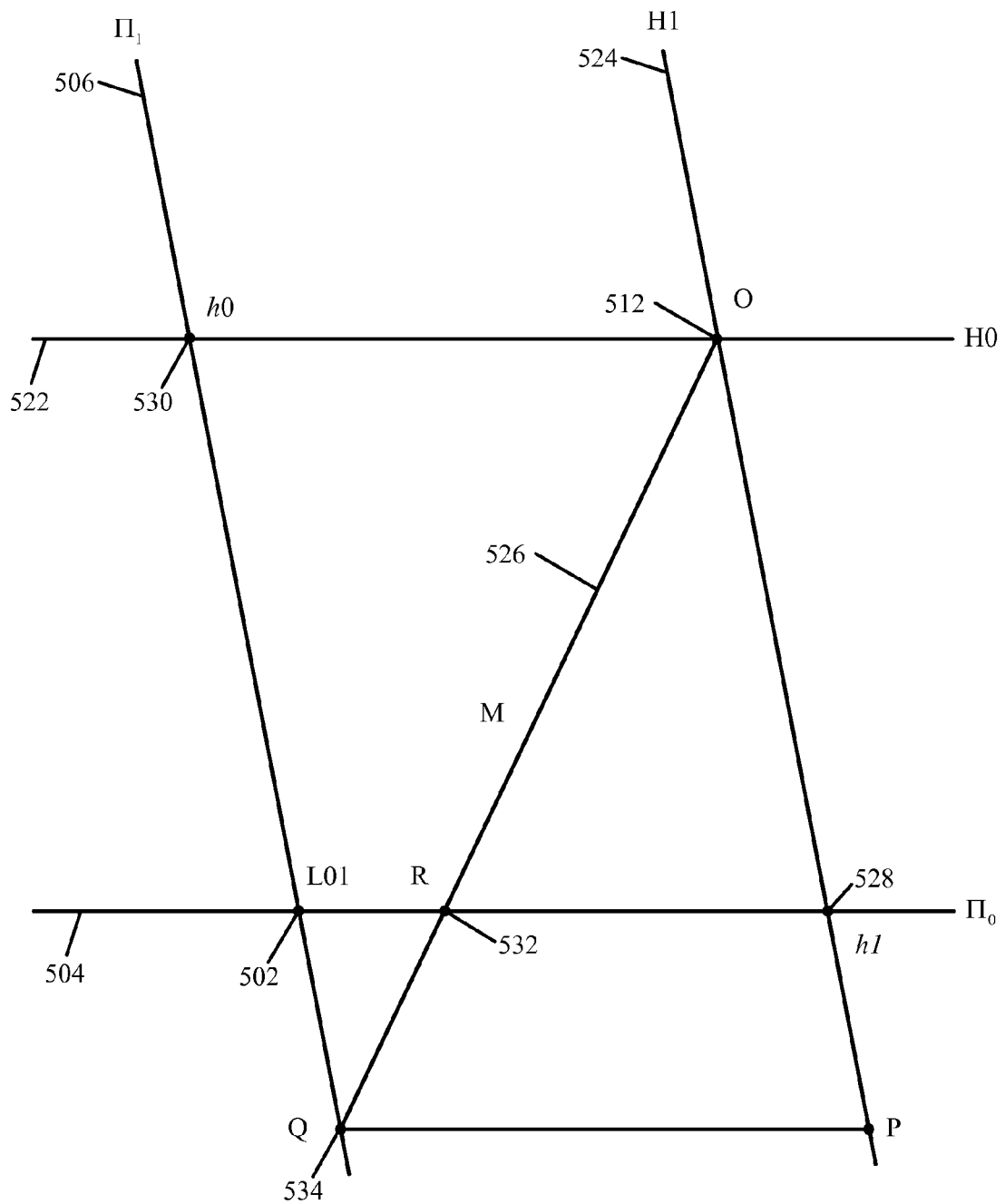
FIG. 5B is one implementation of an edge-on view of a first and second image plane of a camera along with corresponding horizon lines.

In addition, the projection lines 518, 520 that pass through the sphere center 512 and are orthogonal to the lines H0 and H1, respectively, are denoted as H0⊥, H1⊥. Referring to FIG. 5B which depicts an edge-on view of planes $\Pi_0$, $\Pi_1$, H0, and H1. In some implementations, an auxiliary line $\overline{OQ}$ is defined by a plane M passing through the sphere center O and is parallel to the horizons lines h1 and h0. The plane M intersects the image planes $\Pi_0$ and $\Pi_1$ in a line R and a line Q, respectively. Since the vanishing plane H0 is parallel to the image plane $\Pi_0$, the triangles $\Delta$Oh1R and $\Delta$OPQ are similar to each other, i.e., $\Delta$Oh1R~$\Delta$OPQ, and the corresponding sides of the triangles are proportional. Because $\overline{PQ} = \overline{h_1 L_{01}}$, the distance between h1 and L01 along the direction of the plane H0⊥ is given as:

$$\overline{h_1 L_{01}} = \frac{\overline{OQ}}{\overline{OR}} \times \overline{h_1 R}. \quad (15)$$

Figure 5C:
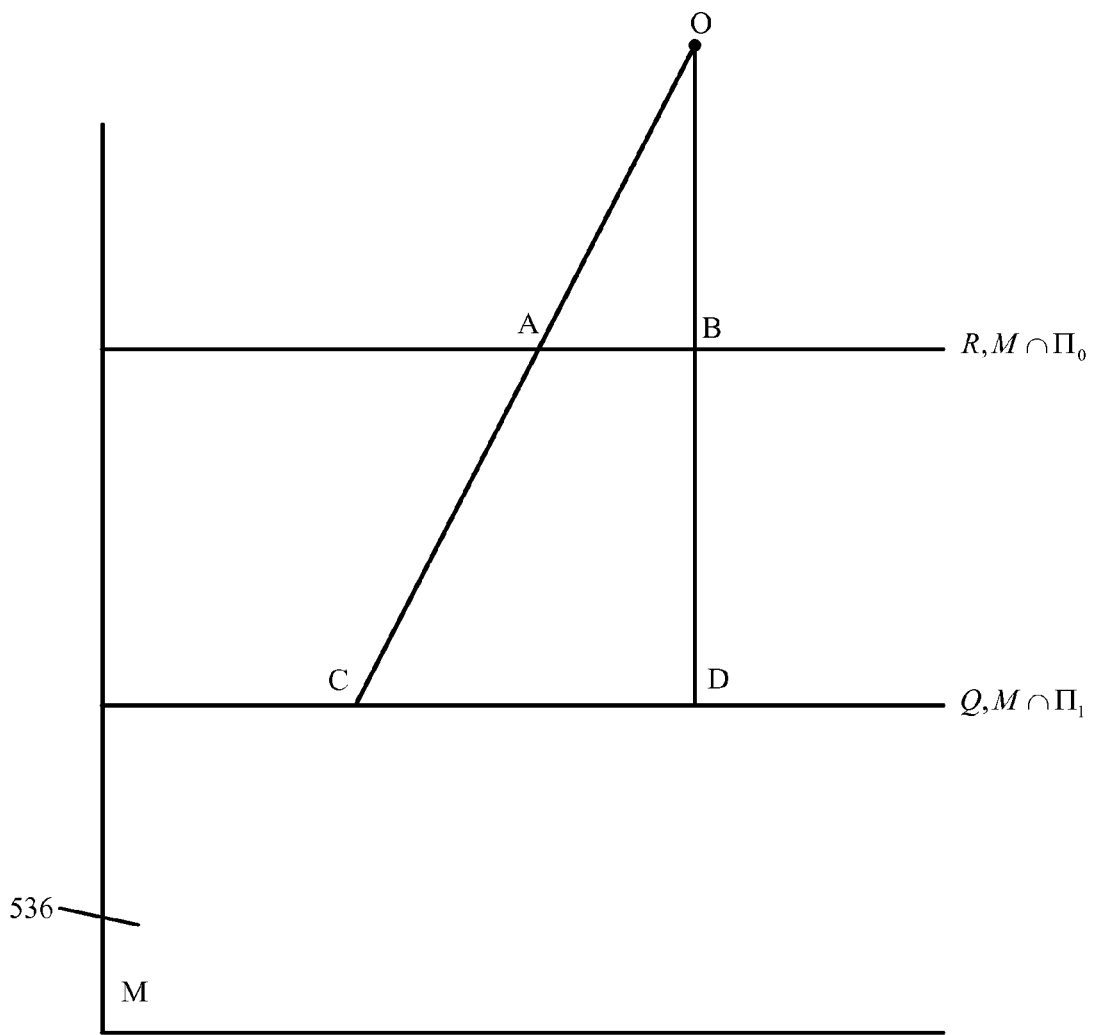
FIG. 5C illustrates one implementation of calculating an orthogonal distance between horizon lines in a first and second image plane of a camera and an intersection line between the first and second image planes.

Referring to FIG. 5C, because the lines R and Q are parallel in the plane M, $\Delta$OAB~$\Delta$OCD; accordingly, the distance ratio $$\frac{\overline{OQ}}{\overline{OR}}$$

can be given as:

$$\frac{\overline{OQ}}{\overline{OR}} = \frac{\overline{CD}}{\overline{AB}}. \quad (16)$$

As a result, the orthogonal distance between the horizon line h1 and the intersection line L01 of the image planes $\Pi_0$ and $\Pi_1$ can be determined based on the following procedure: (i) choosing any point $\pi_h$ that lies on the horizon line h1 in the image plane $\Pi_0$, (ii) defining two parameters $\tau_1 = \pi_h + H0\perp$, and $\tau_2 = \tau_1 + H0$, and (iii) determining the distance based on the mapping matrix $\rho_1^0$, $\tau_1$, and $\tau_2$ using the following formula:

$$\overline{h_1 L_{01}} = \overline{\rho_0^1(\tau_1)\rho_1^0(\tau_2)} \quad (17).$$

Similarly, the distance between the horizon line h0 and the intersection line L01 is determined based on the following procedure: (i) choosing any point $\pi_{h'}$ that lies on the horizon line h0 in the image plane $\Pi_1$, (ii) defining two parameters $\tau_1 = \pi_{h'} + H1\perp$, and $\tau_2 = \tau_1 + H1$, and (iii) determining the distance $\overline{h_0 L_{01}}$ based on the inverse mapping matrix $\rho_0^1$ $\tau_1$, and $\tau_2$ using the following formula:

$$\overline{h_0 L_{01}} = \overline{\rho_0^1(\tau_1)\rho_1^0(\tau_2)} \quad (17).$$

In various implementations, the positions of the sphere centers O are determined by two axes N0, N1 that intersect precisely at two points (i.e., each has exactly one intersection point inside the real projective space) where each axis crosses the line L01; the axes N0, N1 lie in the image planes $\Pi_0$ and $\Pi_1$, respectively. In one implementation, the axes are obtained by intersecting a plane Ж passing through the sphere center O with the image planes $\Pi_0$ and $\Pi_1$ (i.e., $\Pi_0 \cap$ Ж and $\Pi_1 \cap$ Ж, respectively); the plane Ж is thus orthogonal to lines that are intersections between any two lines of h0, h1, L01 and $H_0 \cap H_1$ due to the geometrical symmetry. In another implementation, the axes are determined based on the mapping matrices $\rho_1^0$ and $\rho_0^1$. Because $\rho_1^0$ is a rational mapping that is differentiable, a first-order approximation to the mapping $\rho_1^0$ may be obtained via using a linear mapping (e.g., the matrix Jacobian $J_1^0$) thereof to transform tangent vectors at $\pi$ in the image plane $\Pi_0$ to tangent vectors at $\rho_1^0(\pi)$ in the image plane $\Pi_1$.

When the plane H0 is rotated about the axis $H_0 \cap H_1$, the rotating plane H0ROT sweeps from H0 to H1, and the lines of intersection $H_{0ROT} \cap \Pi_0$ and $H_{0ROT} \cap \Pi_1$ are parallel to each other. In particular, $H_{0ROT} \cap \Pi_0$ remains parallel to h1 and $H_{0ROT} \cap \Pi_1$ remains parallel to h0. Since H0ROT is made up entirely of lines passing through the origin O, $\rho_1^0$ maps the lines formed by the first set of the centrally projected points P0 to the lines formed by the second set of the centrally projected points P1. Additionally, because of the geometry of the set of planes $\{\Pi_0, \Pi_1, H0, H1\}$, including that planes $\Pi_0$ and H0 are parallel, planes $\Pi_1$ and H1 are parallel, and all the lines of intersection among the four planes are also parallel, the matrix Jacobian $J_1^0$ maps H0 along the same direction as H1 (i.e., $J_1^0$H0 is parallel to H1). Similarly, $J_0^1$ maps H1 along the same direction as H0 (i.e., $J_0^1$H1 is parallel to H0). The axis N0 in the image planes $\Pi_0$ and $\Pi_1$ can then be characterized by $J_1^0$H0⊥, which is parallel to H1⊥, and $J_1^0$H1⊥, which is parallel to H0⊥, respectively. Further, for any given line that is parallel to H0 in the image plane Π₀, the component of $J_1^0$H0⊥ along the direction of the plane H1 is proportional to the distance from the axis; this can be expressed as:

$$\text{For } \xi \in \text{Axis}(\Pi_0), \pi_1 = \xi + t \cdot H_0, \quad (18),$$

$$(H_1)^T \times (J_1^0(\pi) H_0^\perp) \propto t \quad (19).$$

Accordingly, the axis N0 that includes a point ξ thereon can be determined based on the following approach: (i) constructing a point $\pi_1 = \pi + H_0$ for any point $\pi \in \Pi_0$ and offsetting the point $\pi_1$ by one unit length, parallel to the horizon line h1, (ii) computing the Jacobian matrices $J_1^0(\pi)$ and $J_1^0(\pi_1)$ at π and $\pi_1$, respectively, (iii) computing $\xi = \pi t \cdot H_0$ using t=a/b, where a=H1T×$J_1^0$(π)×H0⊥ and b=H1T×($J_1^0$(π)−$J_1^0$($\pi_1$))×H0¹, and (iv) determining the axis N0 based on the point and the geometrical characteristic that N0 is parallel to H1⊥. The operator "×" herein refers to matrix multiplication, and the notation (A)T refers to matrix transposition. Based on the same principles, the axis N1 that is in the image plane $\Pi_1$ can be determined.

In various implementations, based on the calculated data L01, h0, and h1 and an assumption that the original sphere center is at the origin, the arrangement of four planes, $\Pi_0$, $\Pi_1$, H0, H1, can be constructed and as a result, the centers of the spheres can be determined based on the procedure: (i) computing the intersection Z0 of the axis N0 with the line L01 and the intersection Z1 of the axis N1 with the line L01, wherein Z0∈$\Pi_0$, and Z1∈$\Pi_1$, (ii) determining parameters $\rho_0$ and $\rho_1$ using $\rho_0 = \overline{L_{01}h_1}$ and $\rho_1 = \overline{L_{01}h_0}$ (i.e., the distance between the line of intersection L01 and the horizon lines $h_1 \subset \Pi_0$ and $h_0 \subset \Pi_1$, respectively), and (iii) assuming H0⊥ and H1⊥ point from Z0 and Z1 toward h1 and h0, respectively, the positions of the sphere centers are thus given by:

$$X_0 = Z_0 + \rho_0 \cos(\phi) \times H_0^\perp + \rho_0 \sin(\phi) \times \Pi_0^\perp \quad (20),$$

$$X_1 = Z_1 + \rho_1 \cos(\phi) \times H_1^\perp + \rho_0 \sin(\phi) \times \Pi_1^\perp \quad (21),$$

where φ is the angle between the two image planes $\Pi_0$ and $\Pi_1$ (i.e., $\phi = \angle(\Pi_0, \Pi_1)$) and satisfies 0°≤φ≤180°. When the parameters $Z_0$, $Z_1$, $H_0^\perp$, $H_1^\perp$, $\Pi_0^\perp$, $\Pi_1^\perp$ are given in the coordinates from the xy-plane and $\Pi_0^\perp$, $\Pi_1^\perp$ are both [0, 0, 1]$^T$, the positions of the sphere centers $X_0$, $X_1$ are in the ordinary Cartesian coordinates.

Once the positions of the sphere centers X0, X1 are determined, the observation points Σ0, Σ1 on the sphere surface can be obtained by normalizing the radii S0, S1, directed from the sphere centers to the centrally projected points P0, P1 (i.e., $S_0 = P_0 - X_0$, $S_1 = P_1 - X_1$), to a unit length. In addition, the orientation angles of the spheres can be computed as a 3D orthogonal matrix with determinant 1 (i.e., a proper rotation in 3D space). In one implementation, the original orientation of the sphere $\theta_0$ is defined as an identity matrix of order 3; the relative rotational angle Δθ is then computed as follows:
(i) decomposing the radii S0, S1 using QR-factorization: $Q_0R_0 = S_0$, $Q_1R_1 = S_1$,
(ii) adjusting the signs: let R0; 3, R1; 3 be the third columns of R0, R3, respectively, and set $\epsilon_i = \text{Sign}(R_{0;3}[i] \times R_{1;3}[i])$ for i=1, 2, 3; the sign adjustment Δ is defined as:

$$\Delta = \begin{bmatrix} \varepsilon_1 & 0 & 0 \\ 0 & \varepsilon_2 & 0 \\ 0 & 0 & \varepsilon_3 \end{bmatrix},$$

and (iii) computing the relative rotation angle Δθ using $\Delta\theta = Q_1 \times \Delta \times Q_1^T$.

Because the QR factorization does not necessarily preserve the orientation of corresponding axes when comparing one factorization with another, the sign adjustment (Δ) in the second action is necessary. In addition, this adjustment is sufficient because the third column of the matrix R inherits the orientations assigned to the previous columns during the factorization.

Figure 6:
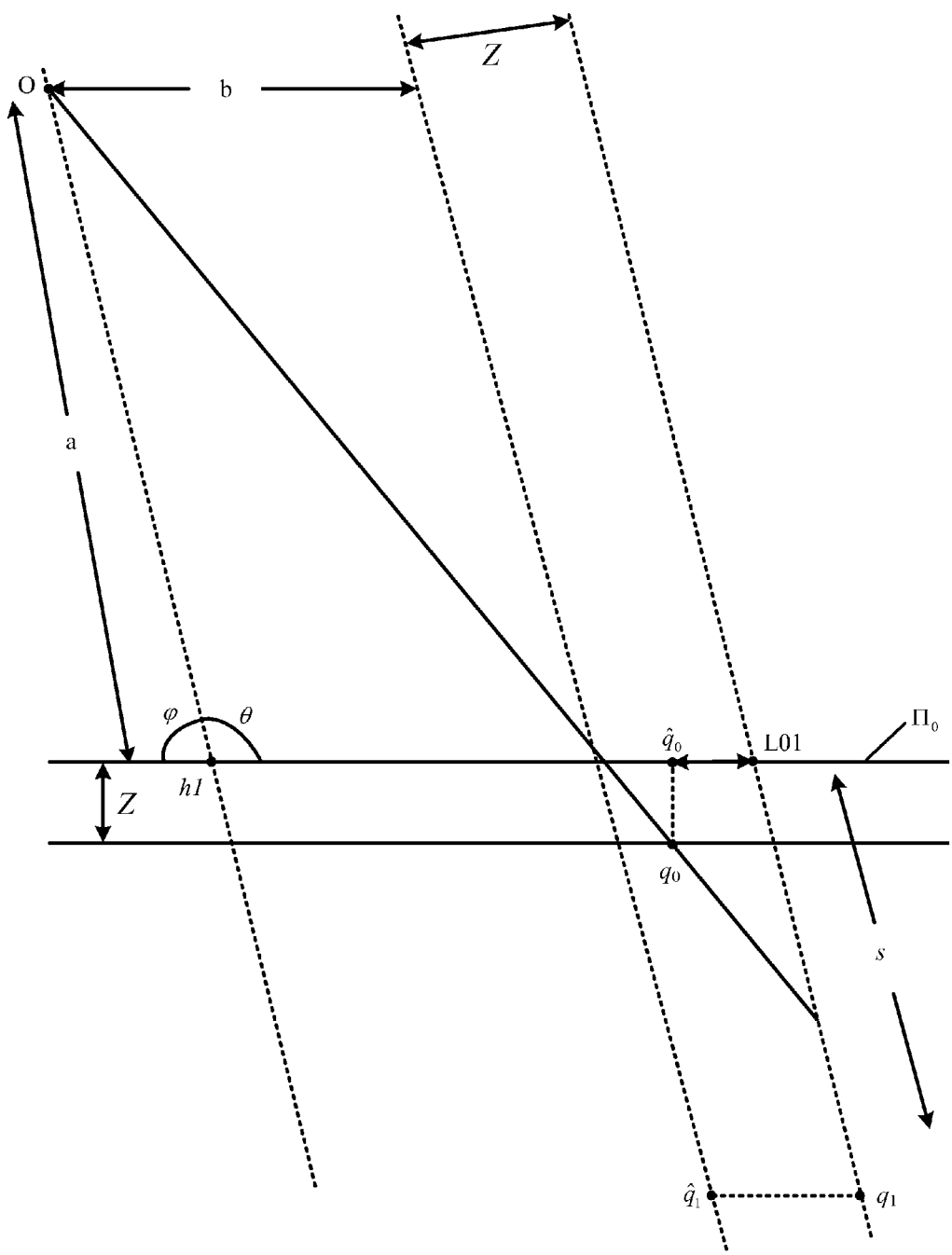
FIG. 6 illustrates one implementation of determining a range of values of an angle between a first and second image plane of a camera.

As described above, when determining the positions of the sphere centers, there is one free parameter, φ, representing the angle between the two image planes $\Pi_0$ and $\Pi_1$. In some implementations, this free parameter φ is determined based on simple geometry of the fifth centrally projected points 426A, 426B in the image planes 416, 431, respectively, (as shown in FIGS. 4A and 4C) and the plane Ж passing through the sphere center O, orthogonal to the image planes $\Pi_0$ and $\Pi_1$. Referring to FIG. 6, the lines $\overline{Oq_0}$ and $\overline{Oq_1}$ lie on the same projective trajectory, thereby having the same slope. Accordingly, when the intersection point between $L_{01}$ and the plane $\Pi_0$ is set as an origin, the sphere center O, q0, and q1 are expressed as follows:

$$O: (-b + a\cos(\theta), a\sin(\theta)), \quad (22)$$

$$q_0: (-r, -z), \quad (23)$$

$$q_1: \left(s\cos(\theta + \pi) + z \cos\left(\theta + \frac{3\pi}{2}\right),\right. \quad (24)$$
$$\left. s\sin(\theta + \pi) + z\sin\left(\theta + \frac{3\pi}{2}\right)\right).$$

where b=$\overline{L_{01}h_1}$, a=$\overline{L_{01}h_2}$, r=$\overline{L_{01}\hat{q}_0}$, and s=$\overline{L_{01}\hat{q}_1}$; $\hat{q}_0$ and $\hat{q}_1$ are defined as the nearest points to $q_0$ and $q_1$ in the image planes $\Pi_0$ and $\Pi_1$, respectively.

Assuming C=cos(θ) and equating the slopes of $\overline{Oq_0}$ and $\overline{Oq_1}$ leads to a quadratic equation:

$$\alpha C^2 + \beta C + \gamma = 0 \quad (25),$$

where α=z⁴−(2ab+(a+s)²+(b−r)²)z²−(rs−bs+ar)², β=−2(a+b)(s−r+a+b)z², and γ=(z²−bz−az+rs−bs+ar)(z²+bz+az+rs−bs+ar). The angle φ can then be computed by solving cos(θ) and using φ=2π−θ. Because there may be multiple solutions for the angle φ, in some implementations, it is necessary to check the solution for consistency with the acquired centrally projected data $P_0$ and $P_1$.

Figure 7A:
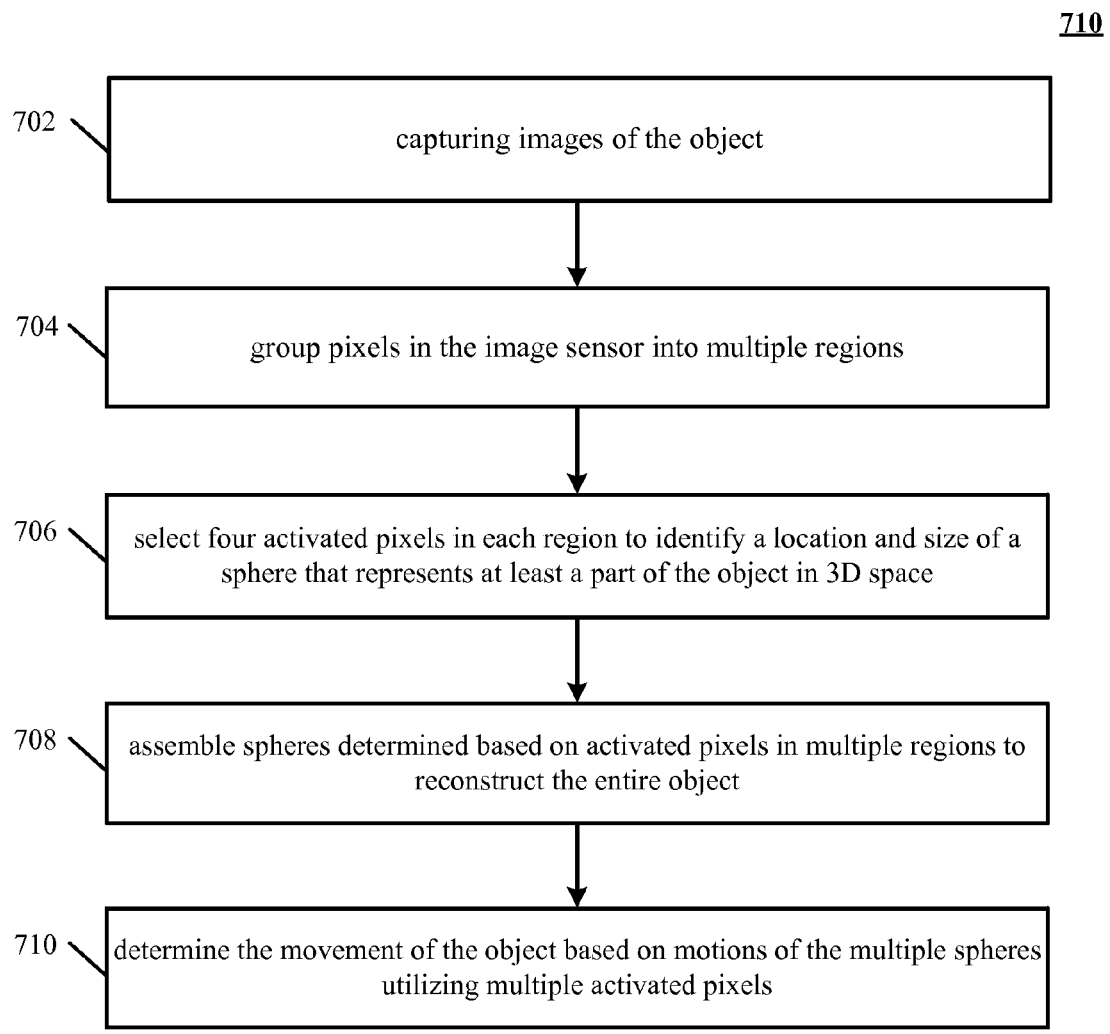
FIG. 7A depicts a representative method of identifying a shape and movement of an object in 3D space in accordance with one implementation of the technology disclosed.

FIG. 7A depicts a representative method 700 of identifying a shape and movement of an object in 3D space in accordance with one implementation of the technology disclosed. In a first action 702, images of the object are captured by at least one image sensor. In a second action 704, pixels in the image sensor are grouped into multiple regions. In each region, a plurality (typically at least five) activated pixels are selected to identify the location and size of a sphere that represents at least a part of the object in 3D space (in a third action 706). Spheres corresponding to different regions of the image sensor can then be assembled to reconstruct the entire object (in a fourth action 708). The movement of the object can then be determined based on motion of the individual spheres (in a fifth action 710).

Figure 7B:
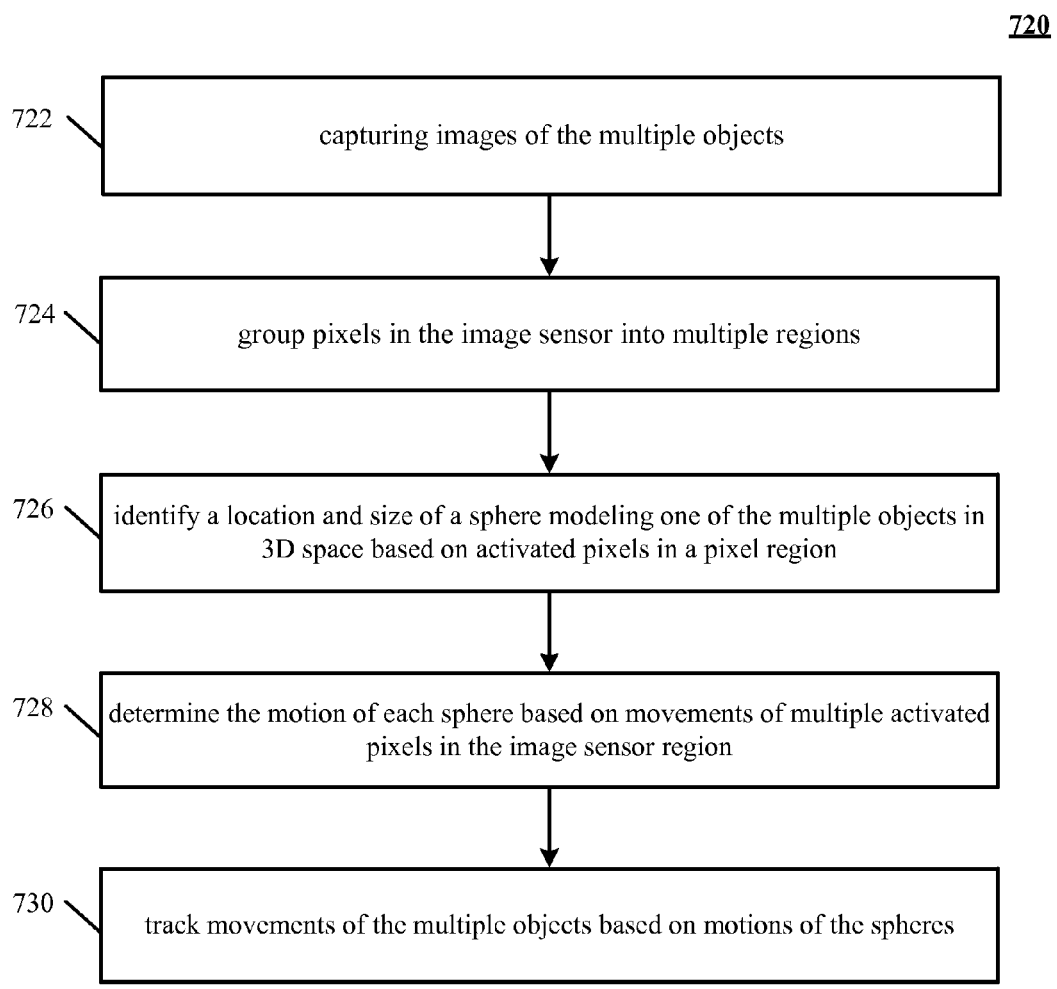
FIG. 7B illustrates a representative method of identifying the shapes and movements of multiple objects in 3D space in accordance with one implementation of the current technology disclosed.

FIG. 7B depicts a representative method 720 of identifying the shapes and movements of multiple objects in 3D space in accordance with one implementation of the technology disclosed. In a first action 722, images of the objects are captured by at least one image sensor. In a second action 724, pixels in the image sensor are grouped into multiple regions. Each region includes activated pixels for modeling one of the objects in 3D space (in a third action 726) by identifying a location and a size of a sphere. In a fourth action 728, the motion of each sphere is determined based on movements of multiple activated pixels in the image sensor regions. The movements of the multiple objects relative to the image sensor can be tracked by tracking the motion of the multiple spheres in 3D space (in a fifth action 730).

A representative method 800 of tracking movement and rotation of a sphere in accordance with implementations of the technology disclosed is shown in FIG. 8. In a first action 802, a set of observation points Σ0 on the sphere surface is projected onto one or more parallel image planes, $\Pi_0$, $\Pi_0'$, at t=t0, forming a first set of projected points, P0, therein; the image planes may be, for example, the planes defined by the image sensors. In a second action 804, a second set of observation points Σ1 are projected onto the same image planes at t=t1, forming a second set of projected points P1. In a third action 806, the observation points Σ1 are moved to overlap with the observation points Σ0; the second set of projected points P1 are located in one or more parallel image planes, $\Pi_1$, $\Pi_1'$; the angle between the image planes $\Pi_0$ and $\Pi_1$ is φ.

In a fourth action 808, two mapping matrices, $\rho_1^0$ and $\rho_0^1$, are determined based on the sets of projected points, P0 and P1; in addition, the horizon lines h0, h1, in the image planes, $\Pi_0$, $\Pi_1$, respectively, are determined based on the mapping matrices, $\rho_1^0$ and $\rho_0^1$. In a fifth action 810, the horizon lines h0 and h1 determine the intersection line L01 between the two image planes $\Pi_0$ and $\Pi_1$. Based on the information about the horizon lines h0, h1 and the intersection line L01, the geometry of the image planes $\Pi_0$, $\Pi_1$ and the corresponding vanishing planes H0, H1 is determined (in a sixth action 812). In a seventh action 814, the angle φ between the image planes $\Pi_0$ and $\Pi_1$ is determined based on the fifth points in the image planes $\Pi_0'$ and $\Pi_1'$. In an eighth action 816, two axes N0 and N1 that intersect precisely at two points where each axis crosses the line L01 are then determined based on the mapping matrices, $\rho_1^0$, $\rho_0^1$, and the geometry of the image planes $\Pi_0$, $\Pi_1$ and vanishing planes H0, H1. The positions of the sphere centers can then be determined based on the two axes N0, N1 for all solutions of the angle φ (in a ninth action 818).

In a tenth action 820, the relative rotational angle of the sphere from t=t0 to t=t1 is determined based on the two sets of the projected points, P0, P1, and the positions of the sphere centers for all solutions of the angle φ. Finally, in an eleventh action 822, the mapping error for each solution of φ is determined via comparing the reconstructed spheres with the acquired observation points Σ0 and Σ1. The solution having the minimum mapping errors is then selected and the sphere is reconstructed based thereon (in a twelfth action 824).

Particular Implementations

In one implementation, a method of tracking movement of an object portion in three-dimensional (3D) space is described. The method includes selecting five observation points on a curved volumetric model fitted to a portion of a real world object, wherein one of the observation points is at a center of the curved volumetric model and the other four observation points are along a perimeter of the curved volumetric model, capturing at times t0 and t1 projections of at least the four perimeter observation points in at least a first image plane of at least one camera, wherein the object moved between t0 and t1, calculating a retraction of the four perimeter observation points at time t1 to their positions at t0, including using the four perimeter observation points to map the captured projections of the perimeter observation points at t0 to a first image plane, and calculate orientation of a second image plane such that the captured projections of the perimeter observation points at t1 to the second image plane are collinear with respective projections in the first image plane with respect to the retracted center observation point, and determining at least translation of the curved volumetric model between the times t0 and t1 using the calculated orientation of the second image plane.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

In one implementation, the method also includes selecting a sixth observation point along a perimeter of the curved volumetric model, capturing at the times t0 and t1 projections of the sixth observation point in a third image plane of the camera, and using a difference in position of the sixth observation point in the third image plane combined with the calculated orientation of the second image plane to calculate rotation of the curved volumetric model.

In one implementation, the retraction is calculated by rescaling positions of the perimeter observation points based on distances between the captured projections of the perimeter observation points at the times t0 and t1 and corresponding centers of the curved volumetric model at the times t0 and t1.

In another implementation, the retraction is calculated by using projective transformations of a mapping matrix and an inverse mapping matrix, which includes applying a canonical frame to projections of the perimeter observation points at t0 mapped to a first image plane and projections of the perimeter observation points at t1 mapped to a second image plane, and applying a forward initial transformation of the projections of the perimeter observation points at t0 to inverse initial transformation projections of the perimeter observation points at t1.

In one implementation, the mapping matrix is constructed by mapping captured projections of the perimeter observation points at t0 to captured projections of the perimeter observation points at t1, which includes extending a line connecting a point on the first image plane with a center of the curved volumetric model at time t0, and intersecting the extended line with the second image plane.

In another implementation, the inverse mapping matrix is constructed by mapping captured projections of the perimeter observation points at t1 to captured projections of the perimeter observation points at t0, which includes extending a line connecting a point on the second image plane, and intersecting the extended line with the second image plane.

In one other implementation, the method includes determining horizon lines on the first and second image planes that are mapped to infinity based on the projective transformations of the mapping matrix and inverse mapping matrix. The method also includes determining positions of the centers of the curved volumetric model at the times t0 and t1 by identifying an intersection line between the first and second image planes and corresponding vanishing planes not mapped to any image plane. In one implementation, the intersection line is identifies based on geometry of the first and second image planes and corresponding vanishing planes by determining planes lines that include orthogonal projections of a center of the curved volumetric model in the first and second image planes and are parallel to horizon lines in the first and second image planes, extending projection lines that pass through the center of the curved volumetric model and are orthogonal to the plane lines, creating a pair of intersection lines where the third image plane intersects with the first and second image planes responsive to extension of an auxiliary line in a third image plane that passes through the center of the curved volumetric model and is parallel to the horizon lines in the first and second image planes, and calculating orthogonal distance between the horizon lines in the first and second image planes and the intersection line between the first and second image planes responsive to construction of congruent triangles by the pair of intersection lines and the horizon lines in the first and second image planes.

In some implementations, the method also includes determining a range of values of an angle between the first and second image planes based on the sixth observation point along the perimeter of the curved volumetric model. It further includes determining positions of the centers of the curved volumetric model at the times t0 and t1 by constructing two axes that intersect at two points and also intersect the intersection line based on the mapping matrix and inverse mapping matrix, geometry of the first and second image planes and corresponding vanishing planes, and a range of values of the angle between the first and second image planes.

In one implementation, the method includes determining a relative rotational angle of the curved volumetric from t0 to t1 based on the captured projections of the perimeter observation points at the times t0 and t1 and positions of the centers of the curved volumetric model for the range of values of the angle between the first and second image planes. It also includes calculating a mapping error for the range of values of the angle by comparing new curved volumetric models constructed based on the determined positions of the centers of the curved volumetric model with the observation points along the perimeter of the curved volumetric model, and selecting a particular new curved volumetric model with minimum mapping error. It further including calculating positions of the observation points by normalizing, to a unit length, radii directed from corresponding centers of the new curved volumetric models to projections of the observations points.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method of tracking movement of an object portion in three-dimensional (3D) space is described. The method includes capturing at times t0 and t1 projections of at least four perimeter observation points on a curved volumetric model fitted to a portion of a real world object, calculating a retraction of the four perimeter observation points at time t1 to their positions at t0 by using projective transformations of a mapping matrix and an inverse mapping matrix based on a first image plane to which projections of the perimeter observation points at t0 are mapped and a second image plane to which projections of the perimeter observation points at t1 are mapped, determining horizon lines on the first and second image planes that are mapped to infinity based on the projective transformations of the mapping matrix and inverse mapping matrix, determining positions of centers of the curved volumetric model at the times t0 and t1 by identifying an intersection line between the first and second image planes and corresponding vanishing planes not mapped to any image plane, determining a range of values of an angle between the first and second image planes based on a sixth observation point along the perimeter of the curved volumetric model, determining positions of the centers of the curved volumetric model at the times t0 and t1 by constructing two axes that intersect at two points and also intersect the intersection line based on the mapping matrix and inverse mapping matrix, geometry of the first and second image planes and corresponding vanishing planes, and the range of values of the angle between the first and second image planes, and determining a relative rotational angle of the curved volumetric from t0 to t1 based on the captured projections of the perimeter observation points at the times t0 and t1 and positions of the centers of the curved volumetric model for the range of values of the angle between the first and second image planes.

This method and other implementations of the technology disclosed can include one or more of the following features and/or features described in connection with additional methods disclosed.

In one implementation, the method also includes calculating a mapping error for the range of values of the angle by comparing new curved volumetric models constructed based on the determined positions of the centers of the curved volumetric model with the observation points along the perimeter of the curved volumetric model, and selecting a particular new curved volumetric model with minimum mapping error. It further includes calculating positions of the observation points by normalizing, to a unit length, radii directed from the corresponding centers of the new curved volumetric models to projections of the observations points.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method of tracking movement of a portion of a real world object in three-dimensional (3D) space is described. The method includes capturing images of a real world object by at least one image sensor, wherein the real world object is in a three-dimensional (3D) space within detection range of the image sensor, grouping pixels in the image sensor into one or more pixel regions that correspond to one or more spatial partitions of the 3D space, representing different portions of the real world object in the spatial partitions by a collection of curved volumetric models, activating a set of pixels in a particular pixel region in response to light transmitted from a particular curved volumetric model in a corresponding spatial partition, and determining a movement of a portion of the real world object represented by the curved volumetric model responsive to movements of the activated pixels.

This method and other implementations of the technology disclosed can include one or more of the following features and/or features described in connection with additional methods disclosed.

In one implementation, the method includes determining a location of the real world object based on movements of the activated pixels. In another implementation, the method includes determining a size of the real world object based on movements of the activated pixels.

In some implementations, if an average movement of the activated pixels is within a threshold value, the method includes determining that movement of the activated pixels is in response to movement of the real world object. In other implementations, if an average movement of the activated pixels is above a threshold value, the method includes determining that movement of the activated pixels is in response to a change in shape or size of the real world object.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In one implementation, a method of tracking a movement of an object in 3D space is described. The method includes capturing first and second sets of light pattern images generated by light cast from the object, each set of light pattern images comprising a plurality of projection points, analyzing a projection point from each of the first and second sets to computationally determine a set of parameters associating the second set of light pattern images with the first set of light pattern images, computationally determining a set of positions and relative movements of the object based on the parameters and at least some of the projection points in the first and second sets of light pattern images, each position and movement forming a pair associated with one of the parameters, determining a set of computing errors by comparing the determined positions and movements of the object with the first and second sets of light pattern images, each computing error being associated with one position and movement pair, and identifying a position and a relative movement of the object in 3D space based at least in part on the set of the computing errors.

This method and other implementations of the technology disclosed can include one or more of the following features and/or features described in connection with additional methods disclosed.

In one implementation, the set of positions and relative movements of the object is determined based on the parameters and four of the projection points in the first and second sets of light pattern images. In another implementation, the method includes determining a minimum computing error and identifying the position and movement of the object based thereon. In yet some implementations, the plurality of the projection points are located in two parallel image planes offset from one another. In one implementation, determining the set of positions and movements of the object includes determining at least one mapping matrix for mapping points from the second set of light pattern images to the first set of light pattern images.

In one implementation, the mapping matrix is determined by applying a canonical frame to the plurality of projection points in the first and second sets of light pattern images, and applying a forward initial transformation of the plurality of projection points in the second set of light pattern images to an inverse initial transformation of the plurality of projection points in the first set of light pattern images. In another implementation, determining the set of positions and movements of the object includes determining two horizon lines associated with the first and second sets of light pattern images.

In another implementation, determining the set of positions and movements of the object includes applying the mapping matrix to the plurality of projection points in the second set of light pattern images, and determining an intersection line between the first and second sets of light pattern images. In yet another implementation, determining the intersection lines includes computationally selecting a point on one of the horizon lines, computationally defining two parameters based on the selected point and a geometry of two image planes defined by the plurality of projection points in the first and second sets of light pattern images, computing a distance between the intersection line and the one of the horizon lines based on the two parameters and the mapping matrix, and computationally determining the intersection line based on the computed distance and the one of the horizon lines.

The method also includes computationally defining two axes that each cross the intersection line, one of the axes lying in a first plane defined by the first set of light pattern images and the other axis lying in a second plane defined by the second set of light pattern images and the mapping matrix, according to some implementations. It further includes computationally determining one of the axes by and computationally determining the axis based on the linear mapping matrix and a geometry of two image planes defined by the plurality of the projection points in the first and second sets of light pattern images.

In one implementation, the linear mapping matrix is a Jacobian matrix. In another implementation, the set of parameters is a set of rotational angles between the first and second sets of light pattern images. In yet another implementation, the movement includes a translational movement and a rotational movement.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein may be used without departing from the spirit and scope of the technology disclosed. Accordingly, the described implementations are to be considered in all respects as only illustrative and not restrictive.

What is claimed is:

1. A method of tracking movement of an object portion in three-dimensional (3D) space, the method including:
    selecting five observation points on a curved volumetric model fitted to a portion of a real world object, wherein one of the observation points is at a center of the curved volumetric model and the other four observation points are along a perimeter of the curved volumetric model;
    capturing at times t0 and t1 projections of at least the four perimeter observation points in at least a first image plane of at least one camera, wherein the object moved between t0 and t1;
    calculating a retraction of the four perimeter observation points at time t1 to their positions at t0, including using the four perimeter observation points to:
        map the captured projections of the perimeter observation points at t0 to a first image plane; and
        calculate orientation of a second image plane such that the captured projections of the perimeter observation points at t1 to the second image plane are collinear with respective projections in the first image plane with respect to the retracted center observation point; and
    determining at least translation of the curved volumetric model between the times t0 and t1 using the calculated orientation of the second image plane.

2. The method of claim 1, further including:
    selecting a sixth observation point along a perimeter of the curved volumetric model;

capturing at the times t0 and t1 projections of the sixth observation point in a third image plane of the camera; and using a difference in position of the sixth observation point in the third image plane combined with the calculated orientation of the second image plane to calculate rotation of the curved volumetric model.

3. The method of claim 1, further including calculating the retraction by rescaling positions of the perimeter observation points based on distances between the captured projections of the perimeter observation points at the times t0 and t1 and corresponding centers of the curved volumetric model at the times t0 and t1.

4. The method of claim 1, further including calculating the refraction using projective transformations of a mapping matrix and an inverse mapping matrix, including:

applying a canonical frame to projections of the perimeter observation points at t0 mapped to a first image plane and projections of the perimeter observation points at t1 mapped to a second image plane; and applying a forward initial transformation of the projections of the perimeter observation points at t0 to inverse initial transformation projections of the perimeter observation points at t1.

5. The method of claim 4, further including constructing the mapping matrix by:

mapping captured projections of the perimeter observation points at t0 to captured projections of the perimeter observation points at t1, including:

extending a line connecting a point on the first image plane with a center of the curved volumetric model at time t0; and intersecting the extended line with the second image plane.

6. The method of claim 4, further including constructing the inverse mapping matrix by:

mapping captured projections of the perimeter observation points at t1 to captured projections of the perimeter observation points at t0, including:

extending a line connecting a point on the second image plane; and intersecting the extended line with the second image plane.

7. The method of claim 4, further including determining horizon lines on the first and second image planes that are mapped to infinity based on the projective transformations of the mapping matrix and inverse mapping matrix.

8. The method of claim 4, further including determining positions of the centers of the curved volumetric model at the times t0 and t1 by identifying an intersection line between the first and second image planes and corresponding vanishing planes not mapped to any image plane.

9. The method of claim 8, further including identifying the intersection line based on geometry of the first and second image planes and corresponding vanishing planes by:

determining planes lines that include orthogonal projections of a center of the curved volumetric model in the first and second image planes and are parallel to horizon lines in the first and second image planes;

extending projection lines that pass through the center of the curved volumetric model and are orthogonal to the plane lines;

responsive to extension of an auxiliary line in a third image plane that passes through the center of the curved volumetric model and is parallel to the horizon lines in the first and second image planes, creating a pair of intersection lines where the third image plane intersects with the first and second image planes; and responsive to construction of congruent triangles by the pair of intersection lines and the horizon lines in the first and second image planes, calculating orthogonal distance between the horizon lines in the first and second image planes and the intersection line between the first and second image planes.

10. The method of claim 2, further including determining a range of values of an angle between the first and second image planes based on the sixth observation point along the perimeter of the curved volumetric model.

11. The method of claim 8, wherein determining positions of the centers of the curved volumetric model at the times t0 and t1 further includes:

constructing two axes that intersect at two points and also intersect the intersection line based on the mapping matrix and inverse mapping matrix, geometry of the first and second image planes and corresponding vanishing planes, and a range of values of the angle between the first and second image planes.

12. The method of claim 10, further including determining a relative rotational angle of the curved volumetric from t0 to t1 based on the captured projections of the perimeter observation points at the times t0 and t1 and positions of the centers of the curved volumetric model for the range of values of the angle between the first and second image planes.

13. The method of claim 10, further including:

calculating a mapping error for the range of values of the angle by comparing new curved volumetric models constructed based on the determined positions of the centers of the curved volumetric model with the observation points along the perimeter of the curved volumetric model; and selecting a particular new curved volumetric model with minimum mapping error.

14. The method of claim 13, further including calculating positions of the observation points by normalizing, to a unit length, radii directed from corresponding centers of the new curved volumetric models to projections of the observations points.

15. A method of tracking movement of an object portion in three-dimensional (3D) space, the method including:

capturing at times t0 and t1 projections of at least four perimeter observation points on a curved volumetric model fitted to a portion of a real world object;

calculating a retraction of the four perimeter observation points at time t1 to their positions at t0 by:

using projective transformations of a mapping matrix and an inverse mapping matrix based on a first image plane to which projections of the perimeter observation points at t0 are mapped and a second image plane to which projections of the perimeter observation points at t1 are mapped;

determining horizon lines on the first and second image planes that are mapped to infinity based on the projective transformations of the mapping matrix and inverse mapping matrix;

determining positions of centers of the curved volumetric model at the times t0 and t1 by identifying an intersection line between the first and second image planes and corresponding vanishing planes not mapped to any image plane;

determining a range of values of an angle between the first and second image planes based on a sixth observation point along the perimeter of the curved volumetric model;

determining positions of the centers of the curved volumetric model at the times t0 and t1 by constructing two axes that intersect at two points and also intersect the intersection line based on the mapping matrix and inverse mapping matrix, geometry of the first and second image planes and corresponding vanishing planes, and the range of values of the angle between the first and second image planes; and determining a relative rotational angle of the curved volumetric from t0 to t1 based on the captured projections of the perimeter observation points at the times t0 and t1 and positions of the centers of the curved volumetric model for the range of values of the angle between the first and second image planes.

16. The method of claim 15, further including:

calculating a mapping error for the range of values of the angle by comparing new curved volumetric models constructed based on the determined positions of the centers of the curved volumetric model with the observation points along the perimeter of the curved volumetric model; and selecting a particular new curved volumetric model with minimum mapping error.

17. The method of claim 15, further including calculating positions of the observation points by normalizing, to a unit length, radii directed from the corresponding centers of the new curved volumetric models to projections of the observations points.

* * * * *